March 19, 1968   G. H. BALENTINE, JR., ET AL   3,373,773
LOOM
Filed July 12, 1965   10 Sheets-Sheet 3

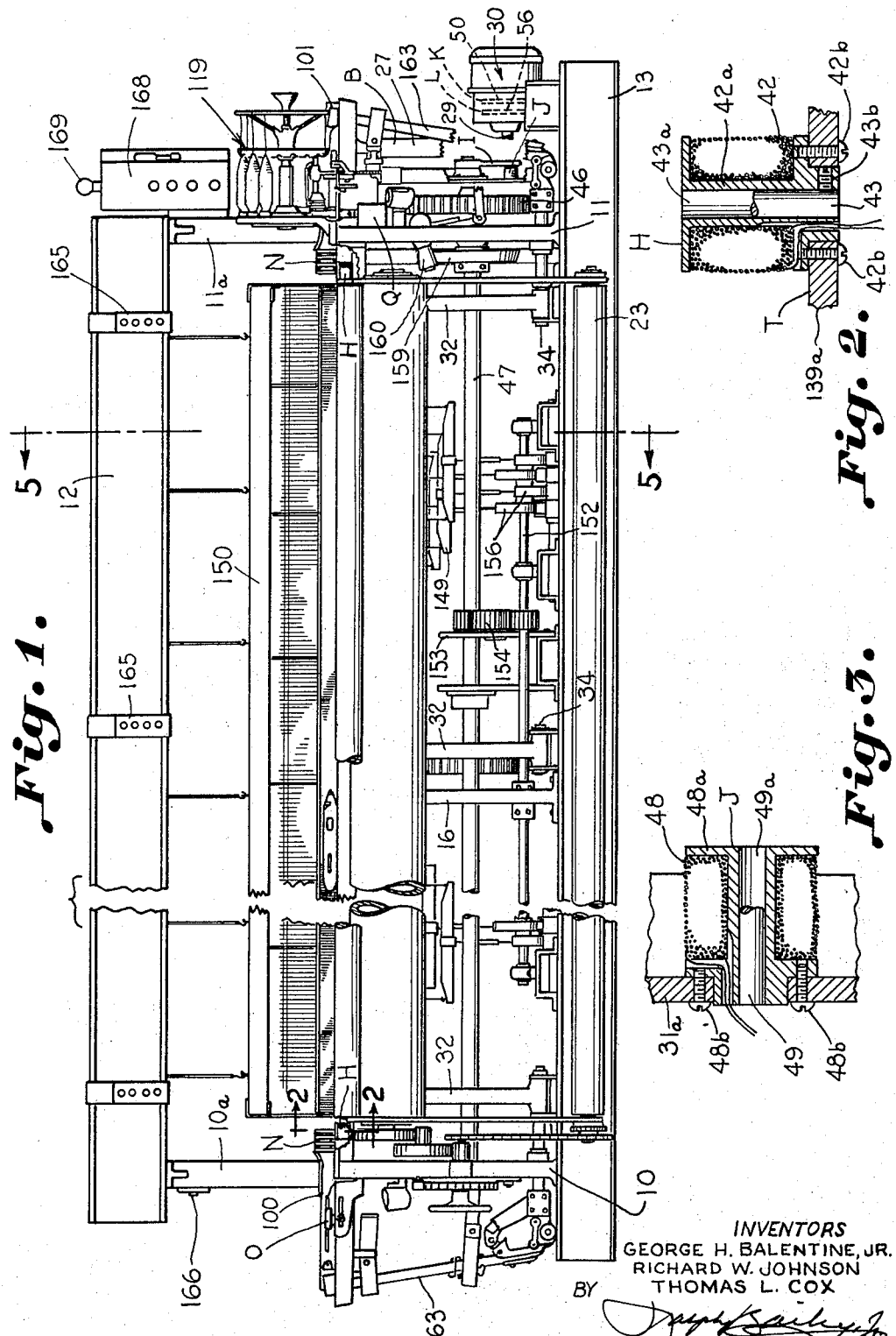

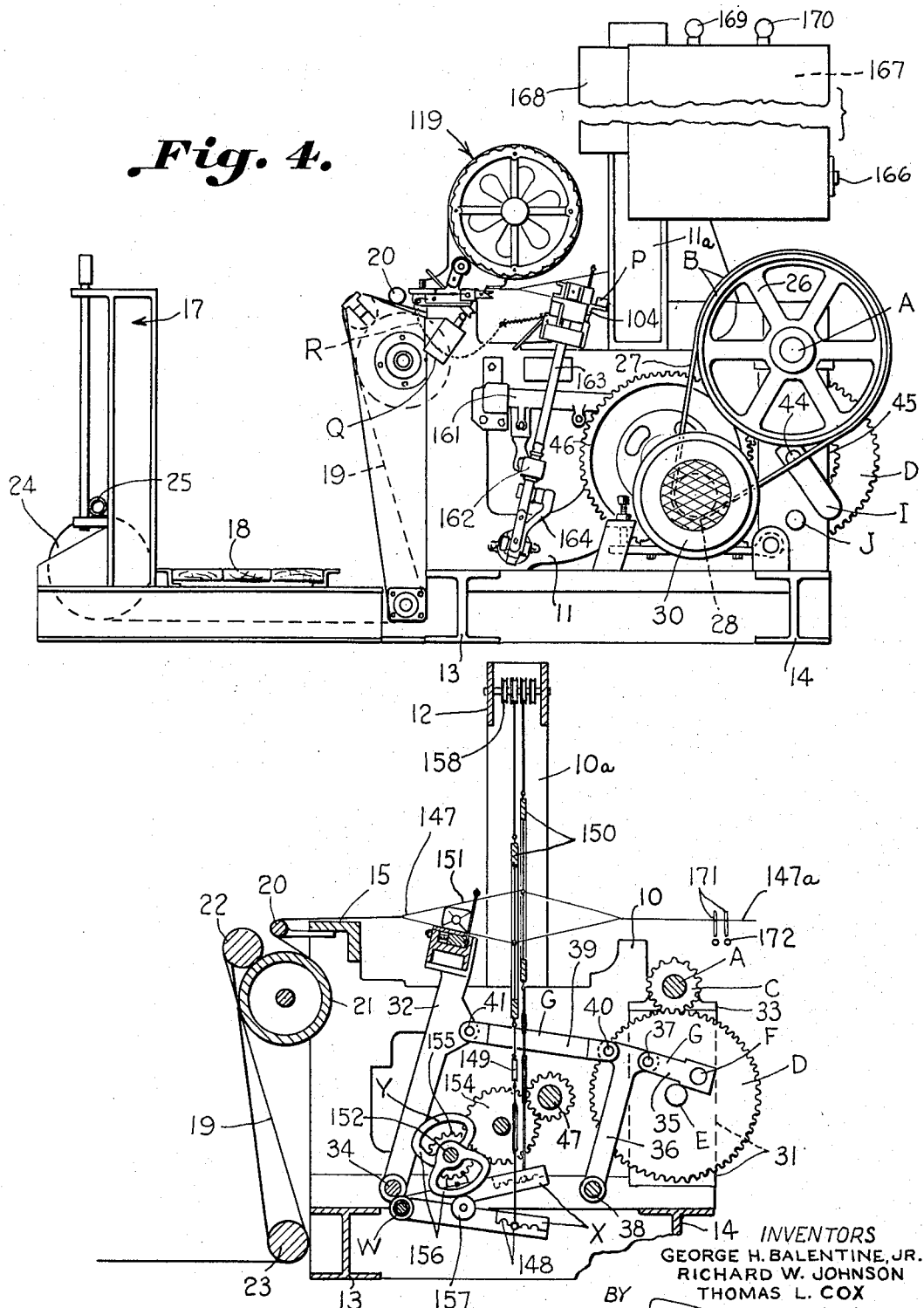

INVENTORS.
GEORGE H. BALENTINE, JR.
RICHARD W. JOHNSON
THOMAS L. COX
BY
ATTORNEY

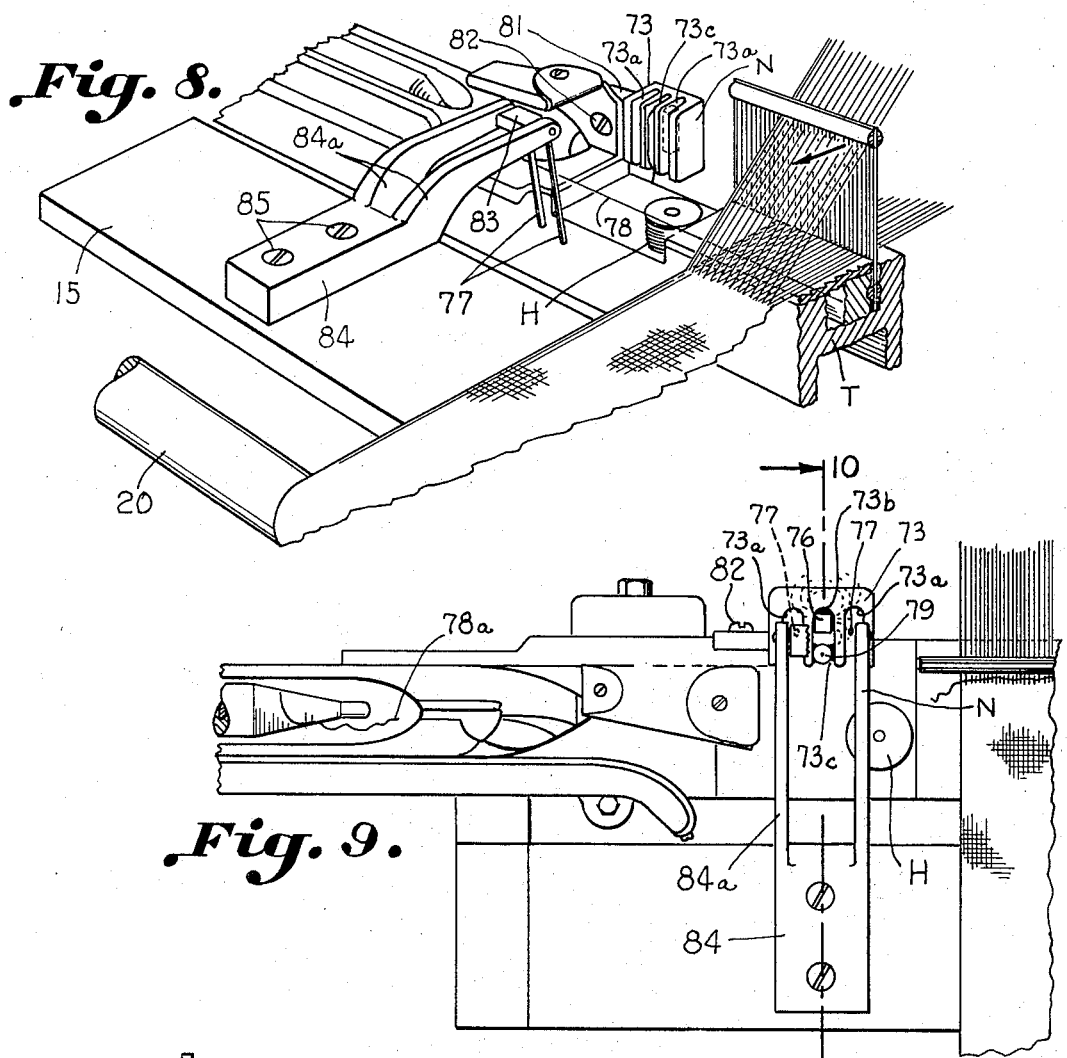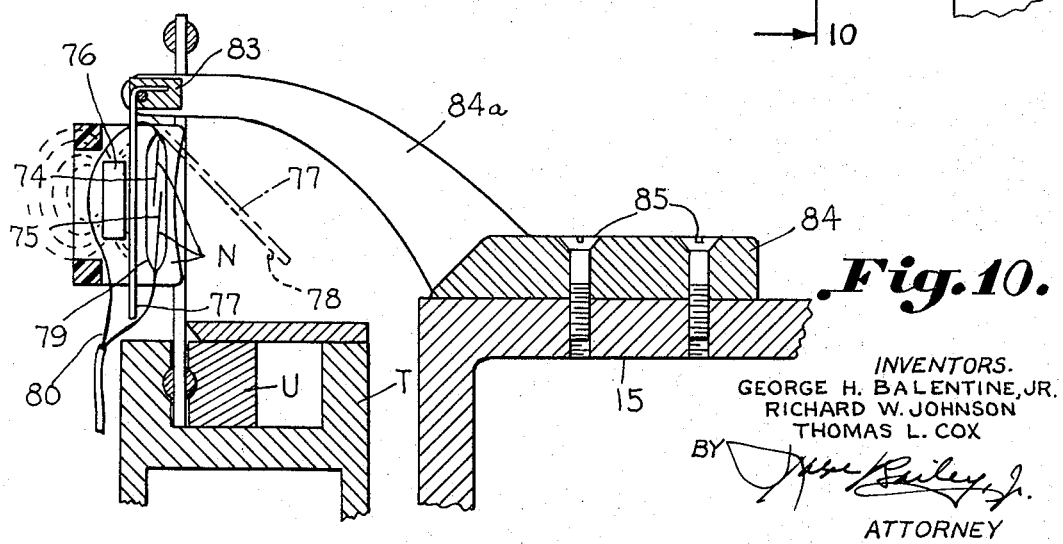

INVENTORS.
GEORGE H. BALENTINE, JR.
RICHARD W. JOHNSON
THOMAS L. COX

BY

ATTORNEY

March 19, 1968  G. H. BALENTINE, JR., ET AL  3,373,773
LOOM

Filed July 12, 1965  10 Sheets-Sheet 6

INVENTORS.
GEORGE H. BALENTINE, JR.
RICHARD W. JOHNSON
THOMAS L. COX
BY

ATTORNEY

March 19, 1968  G. H. BALENTINE, JR., ET AL  3,373,773
LOOM
Filed July 12, 1965  10 Sheets-Sheet 7

INVENTORS.
GEORGE H. BALENTINE, JR.
RICHARD W. JOHNSON
THOMAS L. COX
BY
ATTORNEY

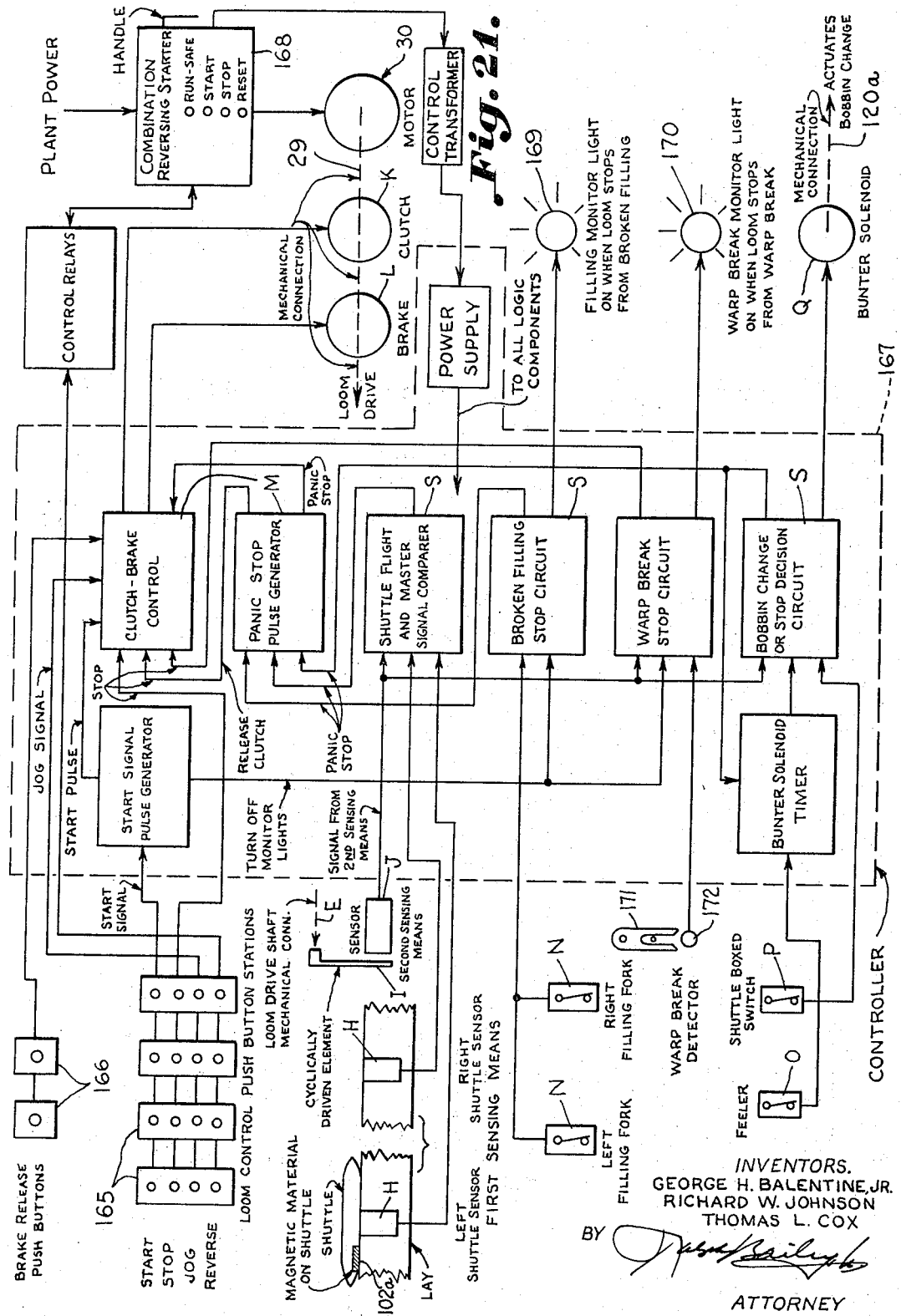

March 19, 1968 G. H. BALENTINE, JR., ET AL 3,373,773

LOOM

Filed July 12, 1965 10 Sheets-Sheet 10

INVENTORS.
GEORGE H. BALENTINE, JR.
RICHARD W. JOHNSON
THOMAS L. COX

BY

ATTORNEY

United States Patent Office 3,373,773
Patented Mar. 19, 1968

3,373,773
LOOM
George H. Balentine, Jr., Rte. 5, Star Park Road 29609;
Richard W. Johnson, 20 Lisa Drive 29607; and
Thomas L. Cox, Apt. D, Windsor Apts., 3701 Buncombe Road 29609, all of Greenville, S.C.
Filed July 12, 1965, Ser. No. 471,025
43 Claims. (Cl. 139—1)

ABSTRACT OF THE DISCLOSURE

An improved protection system is provided for looms wherein sensors are positioned on the lay and a cyclical element is driven by cyclically driven means on the loom. The element produces a signal which would stop loom operation if the shuttle has not reached a required position in relation to a sensor. In conjunction with the protection system an improved lay drive is provided. Other improvements include a loom drive, fault detectors, shuttle position detectors, a thread cutter, transfer mechanism, lay structure, control circuitry and associated parts.

Figure 7:
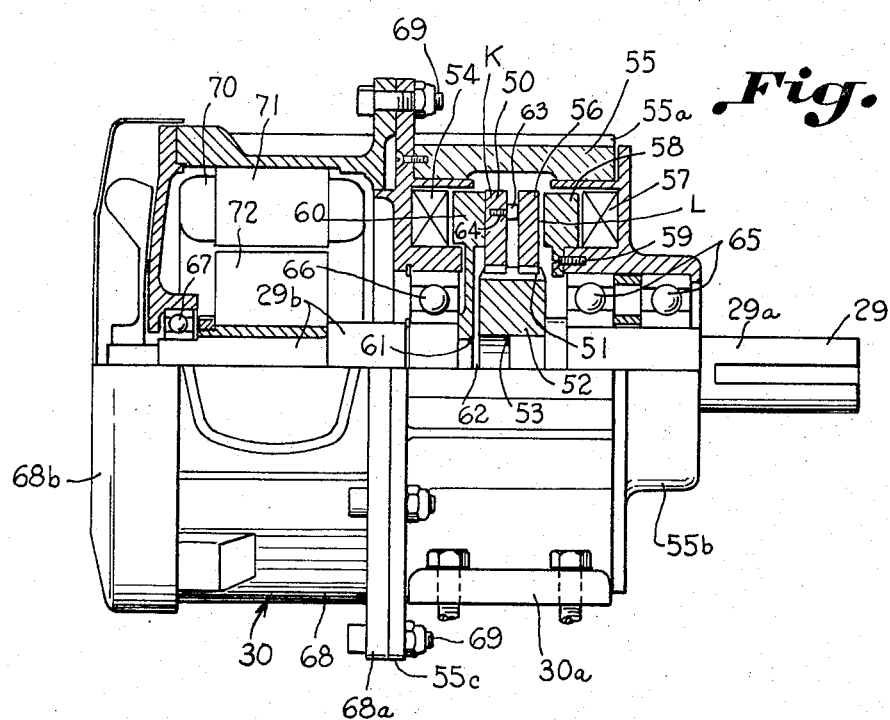

This invention relates to looms, controls therefor and auxiliary devices.

Many attempts have been made to provide controls, including protection systems, for looms whereby a loom could be stopped in the event of a faulty operating condition to avoid damage to loom components and the fabric being woven thereon as, for example, might occur if the shuttle were trapped in the shed during the beat up. Such stopping preferably occurs in a given portion of the loom cycle and the effectiveness of the stopping depends upon the rapidity and reliability with which it is accomplished. Devices formerly used have included shuttle actuated sensing means positioned about midway of the lay with mechanically operated switching mechanism cyclically driven from the loom driving means. In such devices the arrival of the shuttle at the sensor at a given time is required in order to effect continued loom operation. Such devices do not provide for the early arrival of the shuttle. Early shuttle arrival on such devices would not result in continued loom operation, since the shuttle must arrive within a given time period, neither before nor after. Devices employing spaced sensors have been contemplated, but such were evidently incapable of practical operation. It is preferred that the sensors be removed from the warp since a warp or filling knot or obstruction, even at the side of the shed may slow up the shuttle so as to adversely effect loom operation. In other words, it is desirable to detect the shuttle as late as possible on each pick and still allow sufficient time for stopping in the event the shuttle is trapped in the warp shed before the beat up proceeds far enough to damage the warp, cloth or loom parts. The present inventin contemplates effective sensing of faulty conditions and mechanism sufficiently responsive to stop the weaving before damage occurs.

A major difficulty with former protection systems has been their failure to provide a sufficiently rapid stopping of the loom due to inadequate sensitivity or responsiveness, and due to their inability to accomplish the mechanical operations necessary to effect such stoppage. Former clutch-brake arrangements have either been positioned, remote from the loom motor power take-off shaft, where the torque is substantially increased making stopping difficult; or such have been complicated mechanical arrangements not sufficiently responsive to accomplish stopping with sufficient rapidity. Excessive strain has been exerted upon loom components through the use of former devices. For example, excessive strain upon the lay and associated parts is exerted by the daggers on a slam off, and excessive strain is exerted on former crank shaft, since the length of the crank arms thereof must be commensurate with the entire traverse of the lay.

Electrically and mechanically operated bobbin transfer mechanisms have been inadequate for many reasons including the lack of sufficiently sensitive components. Another reason has to do with the inability of former devices to insure that the operations occur in proper sequences. For example, on a filling change, where the shuttle is not properly boxed under the change mechanism, while the change may be aborted, it has been impossible to prevent the occurrence of succeeding picks so that the damage must already have been done in order to detect the damage, as by the filling fork, to stop the weaving. The present invention contemplates avoiding a pick with inadequate filling supply by recognizing such improper boxing and stopping weaving before the damage can occur. The necessity for complicated mechanical actions for use with such former electrically operated transfer devices has further contributed disadvantages in adjustment and insufficiently rapid response.

It is desirable that a warp stop be accomplished with the harnesses level to facilitate operator action to effect repair of the warp. It is also desirable that certain stops be accomplished in an instant in the loom operating cycle before another picking action can occur, as in the event of broken filling, and the present invention contemplates the provision of means for accomplishing such.

It has formerly been difficult for the operator to properly position the loom parts to effect repair or return the loom parts to proper position to start the loom, since the hand wheel is usually the only device provided for making such adjustments. Efforts to solve this problem have included the provision of a reverse clutch and reverse gearing.

Since cams for operating the treadles have been of different sizes on the same loom the shed has not been uniform, resulting in different flight characteristics of the shuttle depending upon its direction. The lay structure has been such that excessive weight has been necessary in order to achieve sufficient rigidity. Increased weight of the lay has multiplied problems in stopping. Thus, the invention contemplates simplified more effective mechanical components permitting the use of more sensitive and reliable fault sensing components with mechanism contributing adequate responsiveness to positively control the entire weaving operation with a minimum of operator effort.

Accordingly, it is an important object of this invention to provide a loom control system which is sufficiently sensitive and which acts with sufficient rapidity to provide effective protection for the loom components and the cloth being woven thereon. The sensors may be positioned outside the shed for maximum protection since there is no further chance of the flight of the shuttle being impeded by the warp.

Another important object of the invention is to provide effective mechanical components to complement the operation of the electrical components of the loom control system.

Another object of the invention is the use of logic components in the electrical system with a signal produced responsive to the cyclical operation of the loom to operate mechanism providing almost instantaneous weaving stops when a malfunction occurs.

Another important object of the invention is to provide an electrically operated means for signalling with an effective and properly responsive clutch-brake combination properly positioned for effecting stoppage of weaving without undue strain on loom components and with sufficient promptness to avoid damage to the loom and the fabric being produced thereon.

Another object of the invention is to provide a loom having controls capable of weaving at increased loom speeds.

Another object of the invention is the provision of a lay drive wherein undue torsion on the drive shaft and the lay is avoided and wherein excessive vertical displacement of the linkage connecting the drive to the lay supports is avoided so that such linkage may be passed beneath the harnesses.

Another object of the invention is to eliminate the conventional crank shaft and provide better lay support for less strain thereon as the swords may be spaced inwardly or other supports added, since the driving connections thereto do not have sufficient vertical displacement to interfere with their being passed under the harnesses. This affords a lighter lay construction which permits higher loom speeds. A more well defined shed results, which improves the efficiency of the controls exerted by devices constructed in accordance with the invention.

Another important object of the invention is the provision of an exceptionally sensitive and reliable filling detector which is not subject to excessive wear and which is capable of withstanding rough treatment during weaving over extended periods of time.

Another important object of the invention is to provide a highly responsive transfer mechanism being capable of use over a long period of time.

Another important object of the invention is to provide a shuttle boxing detector which is exceptionally sensitive and capable of avoiding damage to the shuttle and change mechanism; and which is capable of signalling sufficiently rapidly to avoid another pick when the filling is exhausted or partially exhausted. The decision may be made to abort the change and stop weaving if the shuttle is improperly boxed.

Another object of the invention is to provide a novel thread cutter retractor for withdrawing the thread cutter after the transfer has been initiated by electromagnetic means. Solenoid operated means prevents engagement of the bunter by the lay if boxing is improper.

Another object of the invention is to provide an improved lay structure which is light in weight and avoids the use of a reed cap and which permits easy positioning of the components for the protection system. The low mass permits easier stopping and the greater rigidity of the lay permits more nearly true shuttle flight for maximum utilization of the protection system and higher loom speeds.

Still another important object of the invention is the provision of a treadle mounting which avoids the use of excessively large cams and permits cams all of the same size to be used. This is accomplished by positioning the treadle shafts beneath the fell so that maximum treadle deflection will occur where such is needed for proper harness operation. A well defined warp is thus facilitated for true shuttle flight for best operation of the protection system. More nearly symmetrical shuttle flight characteristics in both directions are accomplished.

Yet another object of the invention is to provide simple, effective loom control in the reverse direction, whereby adjustment of the position of loom parts is easily and safely facilitated.

Another object of the invention is to provide simple controls for the devices accomplishing the above objects with a minimum of operator effort and proficiency.

Another object of the invention is to provide a loom motor driving the loom through a clutch and brake positioned for most effective response to the novel control elements hereof, and which provides variable braking action commensurate with the requirements of the situation calling for braking action.

Another object of the invention is to provide simple means for stopping weaving with the harnesses level responsive to a faulty warp condition.

The construction designed to carry out the invention will be hereinafter described, together with other features thereof.

Figure 6:
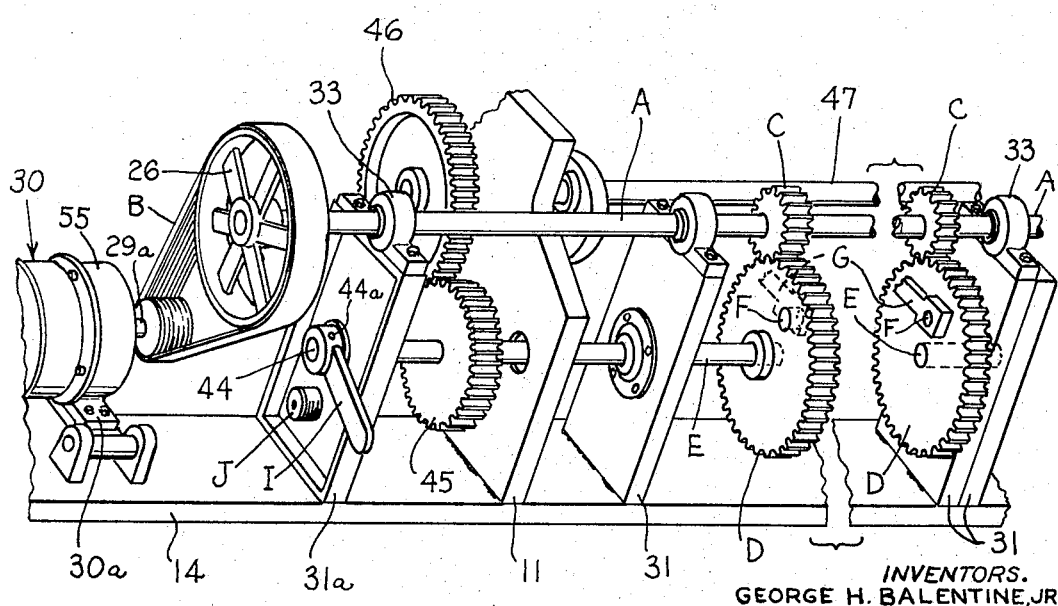
Figure 11:
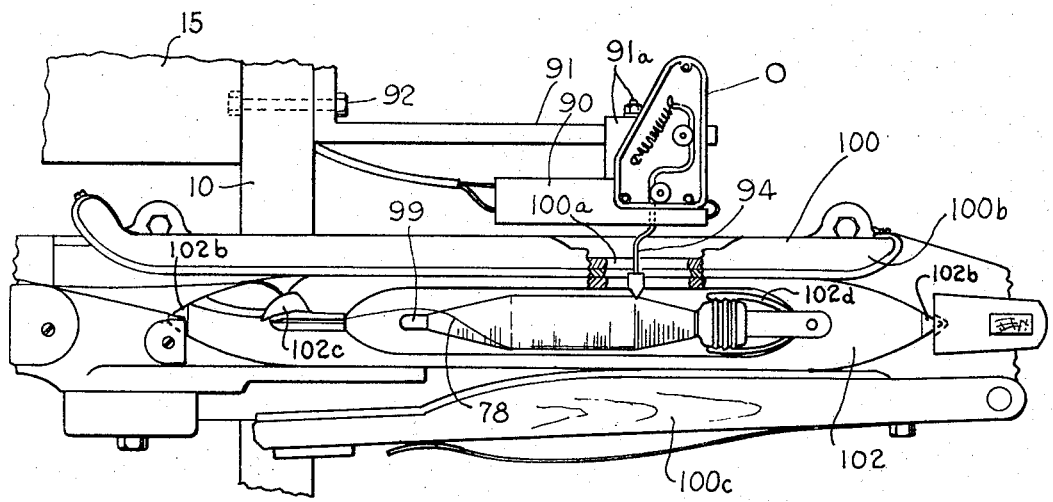
Figure 12:
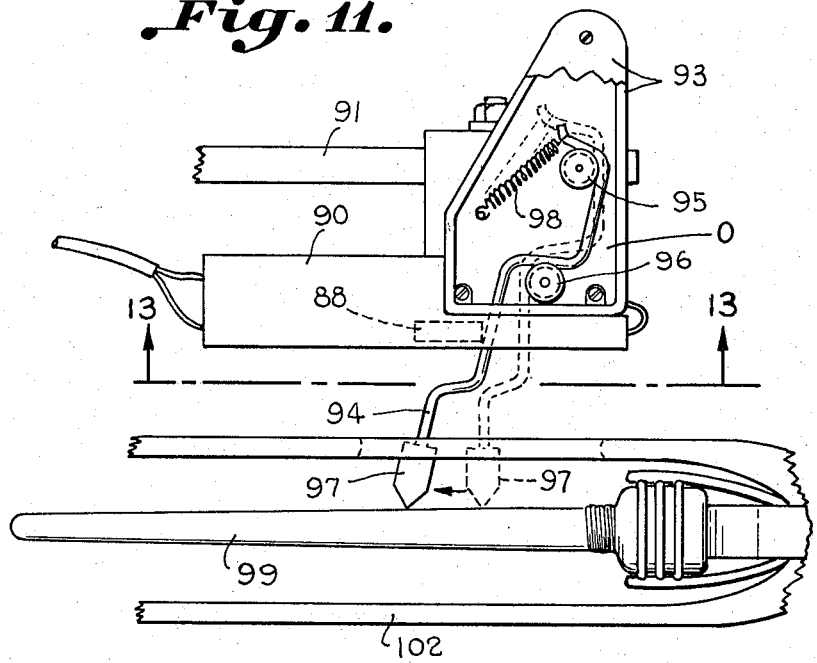
Figure 13:
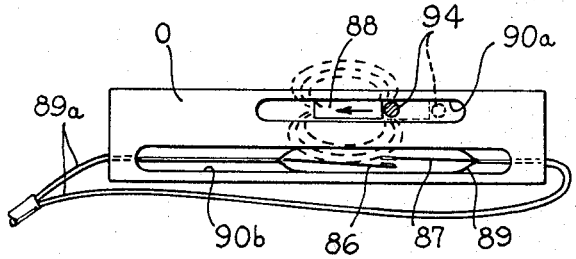
Figure 14:
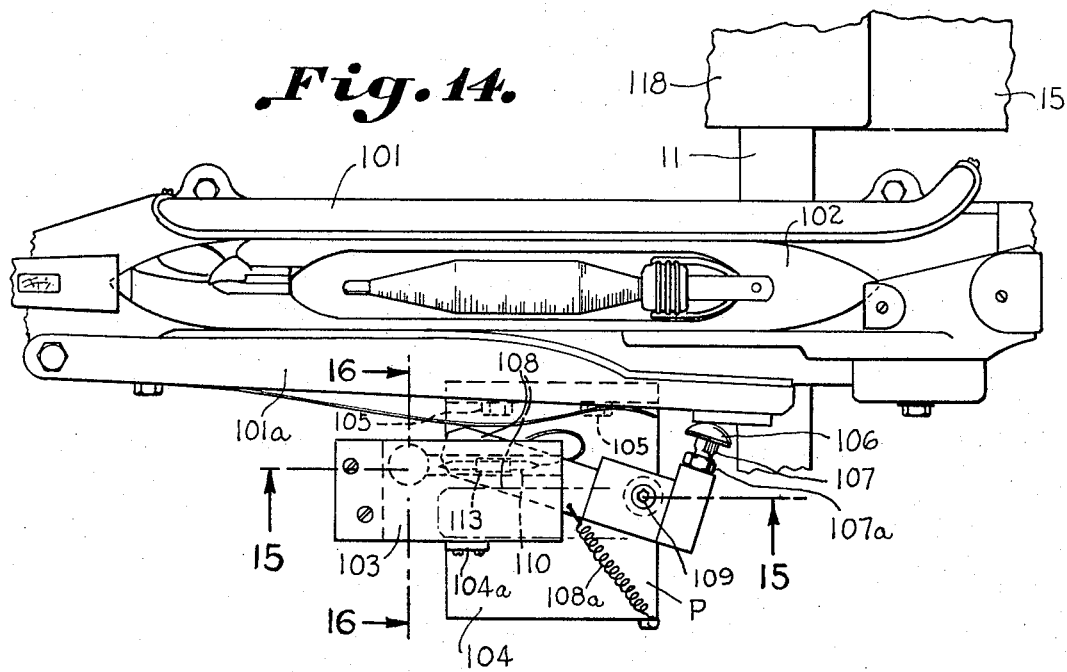
Figure 15:
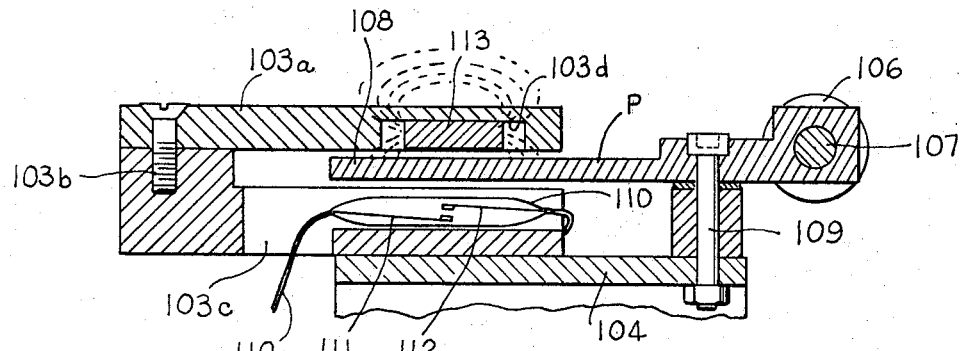
Figure 16:
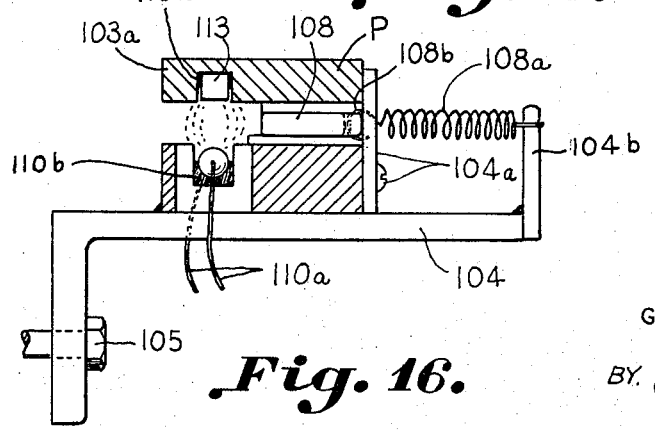
Figure 17:
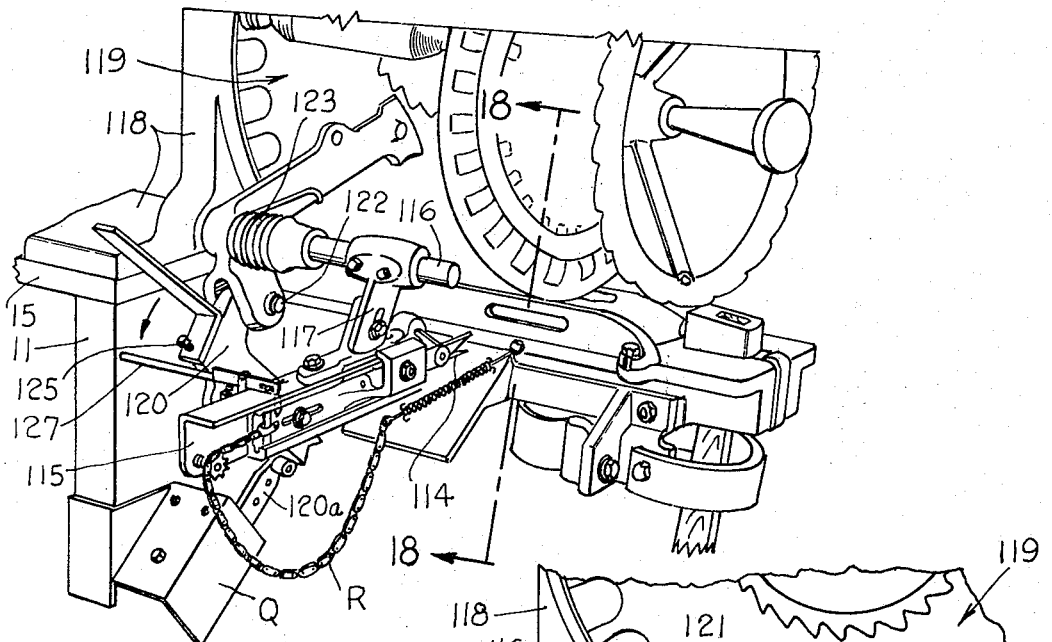
Figure 18:
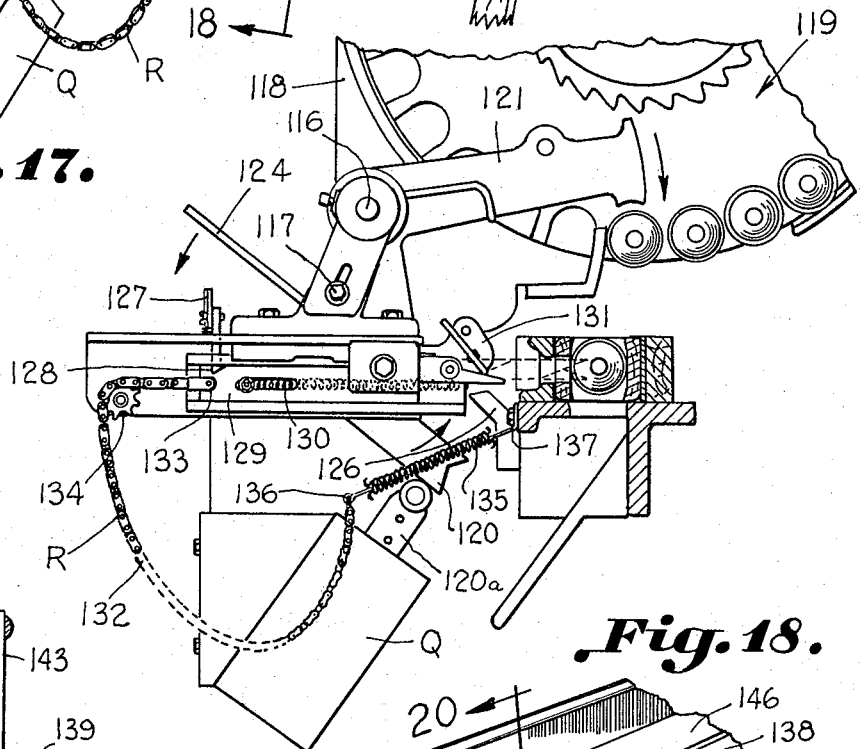
Figures 19, 20:
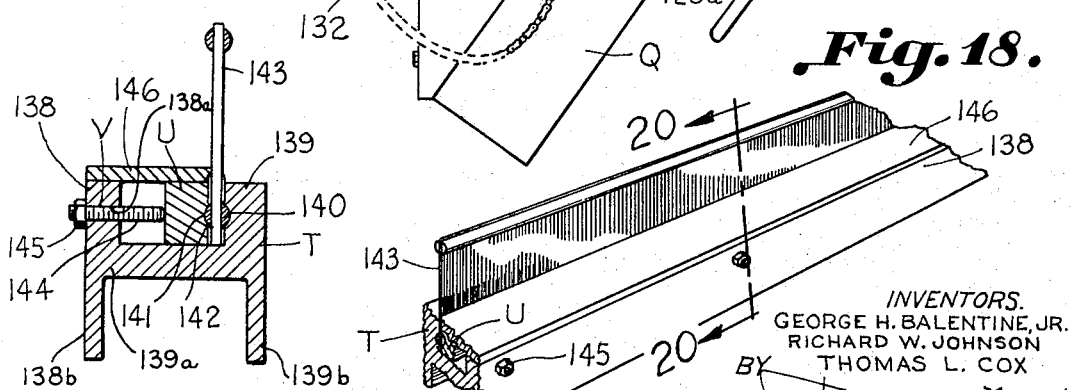
Figure 22:
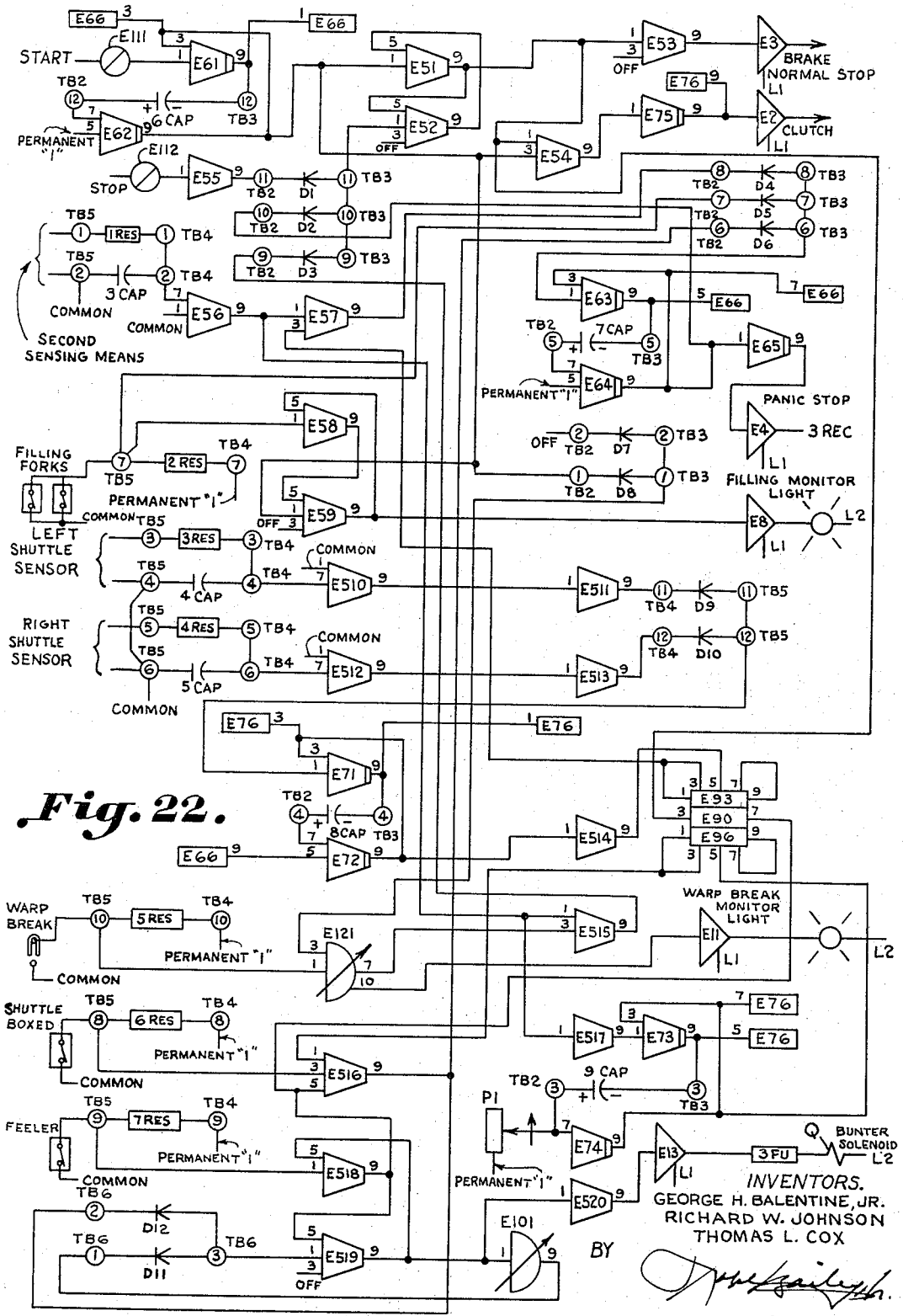
Figure 23:
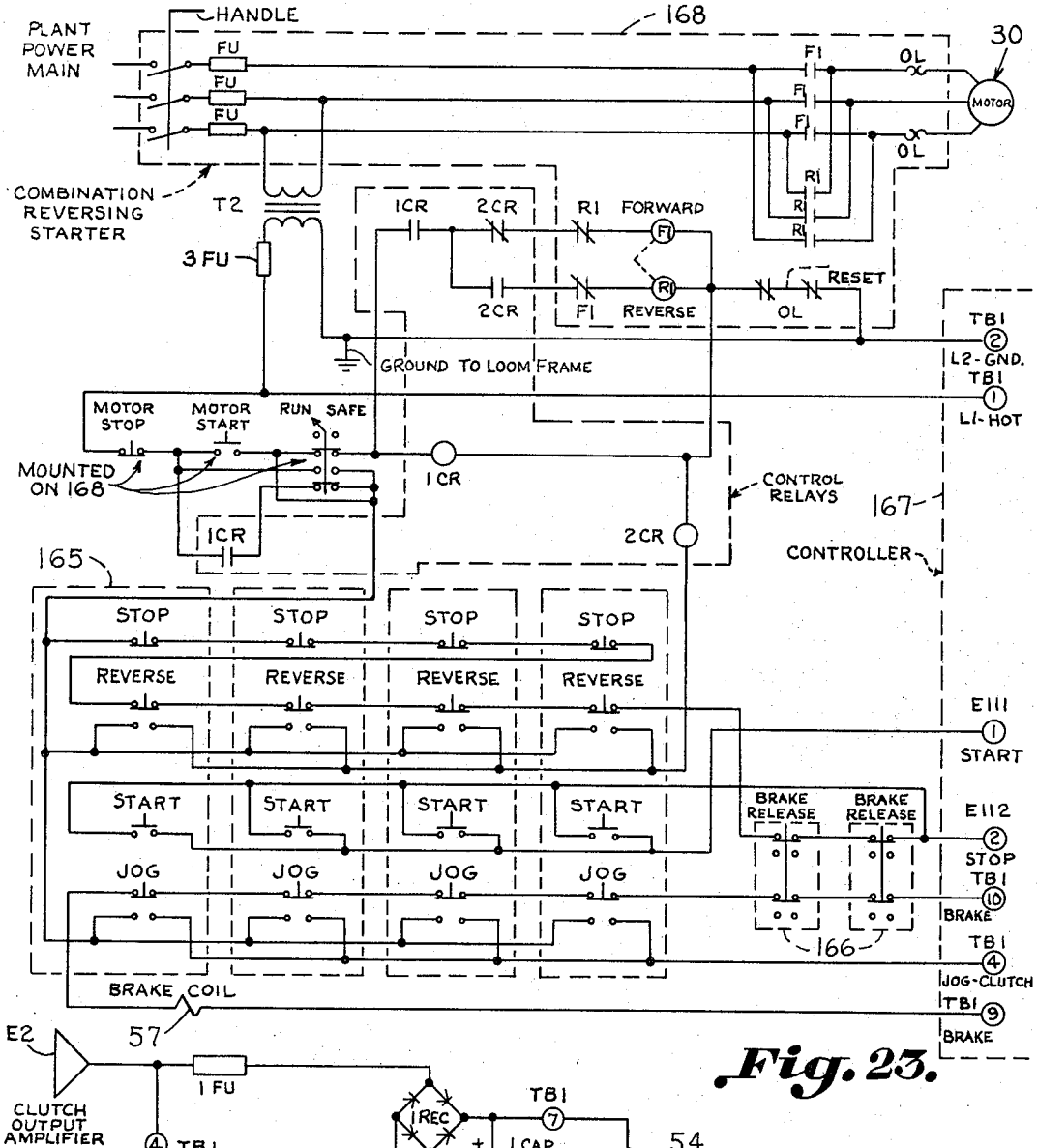
Figure 24:
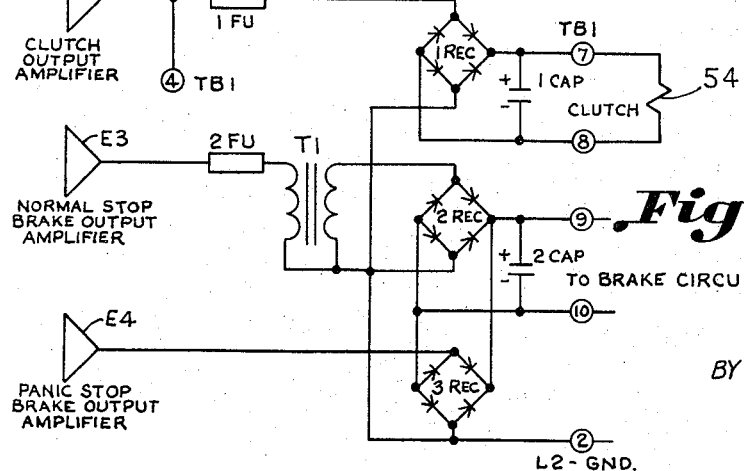

The invention will be more readily understood from a reading of the following specification and by reference to the accompanying drawings forming a part thereof, wherein an example of the invention is shown and wherein:

FIGURE 1 is a front elevation illustrating a loom constructed in accordance with the present invention, FIGURE 2 is a transverse sectional elevation illustrating a sensor used in this embodiment of the present invention taken on the line 2—2 in the left-hand central portion of FIGURE 1, FIGURE 3 is a longitudinal sectional elevation illustrating another sensor used in this embodiment of this invention carried by a bearing stand in the lower right-hand portion of FIGURE 1, FIGURE 4 is a side elevation further illustrating the loom shown in FIGURE 1, FIGURE 5 is a transverse sectional elevation taken on the line 5—5 in FIGURE 1, FIGURE 6 is an enlarged perspective view taken from the right-hand rear portion of FIGURE 1 illustrating drive components of the loom adjacent the motor, FIGURE 7 is an elevational view of the motor taken from the rear in FIGURE 1 with the upper portion in section, FIGURE 8 is a perspective view illustrating a broken filling detector constructed in accordance with the present invention, FIGURE 9 is a plan view further illustrating the subject matter of FIGURE 8, FIGURE 10 is a sectional elevation taken on the line 10—10 in FIGURE 9, FIGURE 11 is a plan view illustrating a transfer feeler construction in accordance with the present invention, FIGURE 12 is an enlarged plan view with parts broken away illustrating the details of the mechanism of FIGURE 11 with parts in operating position, FIGURE 13 is a front elevation taken on the line 13—13 in FIGURE 12, FIGURE 14 is a plan view illustrating a shuttle boxing detector constructed in accordance with the present invention, FIGURE 15 is a longitudinal sectional elevation taken on the line 15—15 in FIGURE 14, FIGURE 16 is a transverse sectional elevation taken on the line 16—16 in FIGURE 14 illustrating the parts in retired position, FIGURE 17 is a perspective view illustrating a thread cutter retractor and transfer mechanism used therewith, FIGURE 18 is a transverse sectional elevation taken on the line 18—18 in FIGURE 17, FIGURE 19 is a perspective view illustrating a lay constructed in accordance with the present invention, FIGURE 20 is a transverse sectional elevation taken on the line 20—20 in FIGURE 19, FIGURE 21 is block diagram illustrating the various electrical components and their relation to each other and the mechanical operations actuating and utilizing same, FIGURE 22 is a logic diagram illustrating the solid state components of the controller element of the circuitry illustrated in FIGURE 21, FIGURE 23 is a wiring schematic illustrating certain switching components of the electrical system, and FIGURE 24 is a wiring diagram illustrating clutch-brake power circuitry.

The drawings illustrate a loom having lay supports, a shuttle with a filling supply, shuttle binders, an electric motor for driving the loom through a power take-off shaft extending therefrom, and filling transfer means with a thread cutter. A longitudinal drive shaft A is driven by the motor through a driving means B and carries a number of spaced pinions C (FIGURES 1, 4, 5 and 6). A plurality of spaced relatively large gears D are driving by the pinions. A plurality of spaced longitudinally disposed first shafts E are provided for carrying the large gears centrally thereon. A second stub shaft F extends outwardly from each of the large gears and is carried eccentrically thereon. Linkage means G connects the second shafts and lay supports.

A first sensing means H, including a pair of spaced signal producing members or sensors, is carried by the lay for causing a first electrical signal as the shuttle moves adjacent thereto (FIGURES 1, 2, 8 and 21). The first electrical signal indicates that the shuttle is in flight between the sensors and will be discussed in greater detail below, but for the present this statment should suffice. An element I is cyclically driven by the drive shaft through a stub shaft E (FIGURES 1, 4, 6 and 21). A second sensing or signal producing means J is carried adjacent the loom for producing a second electrical signal as the element I moves adjacent thereto. When the shuttle completes that portion of its flight necessary to cause the first electrical signal (passes the second of the two sensors of the sensing means H in any given flight of the shuttle) prior to the loom arriving at a given position in its cycle (as would result in production of the second electrical signal) the loom continues weaving. The second electrical signal is effective to stop weaving unless the first signal is thus received. If the shuttle does not properly progress, as in the event of a weak pick for example, the second electrical signal will occur before completion of the first signal so that the second signal may institute stoppage of weaving.

An electrical clutch K, having coils and a clutch plate, is carried by the power take-off shaft, and normally connects the motor in driving relation to the loom (FIGURES 1, 4, 6, 7 and 21). The power take-off shaft has a separate portion thereof for driving the shaft A (FIGURE 4, 5 and 6) directly through the driving means B. An electrical brake L, having coils and a brake plate, is carried by the power take-off shaft, and is engageable to stop the separate portion of the power take-off shaft. Electronic means M (including the "Panic Stop Pulse Generator" FIGURE 21) is provided for momentarily overexciting the coils of the brake followed by normal excitation thereof, and for deenergizing the coils of the clutch when almost instantaneous stopping, panic stop, is dictated by any of the proper sensors. The clutch is deenergized for both normal and panic stops.

A first contact means N (FIGURES 1, 8, 9, 10 and 21) opening and closing contacts in response to a magnetic field altered by the condition of the filling, includes elements carried by the lay adjacent each end thereof. Each such element includes a filling fork or feeler which is moved to a retracted position by the filling but in the absence of filling effects the magnetic field. Such altering of the magnetic field causes a panic stop.

A second contact means O (FIGURES 1, 11, 12, 13 and 21), opening and closing contacts in response to a magnetic field has a feeler moving when the filling needs replenishing, affecting the magnetic field. A third contact means P (FIGURES 4, 14, 15, 16 and 21) opening and closing contacts in response to a magnetic field has an element normally moved by the binder to affect the magnetic field. The magnetic field must be so affected, before the loom reaches a predetermined point in its cycle or within a predetermined time required to reach such point, after operation of the second contacts O to permit a bobbin change and continued weaving. An electromagnetic means Q actuates the transfer bunter in response to the second contact means O and continues to hold the transfer bunter in striking position provided the third contact means is operated within such predetermined time (FIGURES 1, 17, and 21). Means R, including a flexible chain connected on one end to the thread cutter and on the other end to the lay, are provided for returning the thread cutter after operation thereof (FIGURES 17 and 18).

Means S (including certain "Controller" components illustrated in FIGURE 21 are provided for actuating the electronic means M if the first signal caused by the first sensing means H does not occur prior to said second signal produced by the second sensing means J, or in the absence of filling which would actuate the first contact means N, or if the shuttle is not boxed within the above designated predetermined time.

Upon actuation of the "Warp Break Detector" (FIGURES 5 and 21) the "Warp Break Stop Circuit" provides a signal of predetermined duration which, upon the occurrence of a second signal from the second sensing means J, signals the "Clutch-Brake Control" to institute a normal stop permitting the loom to stop weaving with the harnesses substantially level.

A lay structure is illustrated which includes an elongated longitudinal member T having a substantially H-shaped cross-section (FIGURES 19 and 20). The member T has spaced upper vertical flange members and a seat within an intermediate portion of the inner portion of one of said flange members. A longitudinal laterally movable member U is carried between the flange members. A complementary seat is formed within the laterally movable member opposite the first mentioned seat forming a confining support for the lower frame member of the reed. Removable means V are provided for forcing the laterally movable member against the lower frame member confining same within the support. A race plate is provided across the top of the other flange and laterally movable member U. This lay structure facilitates the positioning of the sensors of the first sensing means H thereon, since the sensors may be fastened between the upstanding flanges on the web portion thereof.

A treadle shaft W is provided adjacent the rocker shaft in vertical alignment with the fell of the cloth, and the auxiliary cam shaft is positioned rearwardly of rocker shaft and forwardly of the cam shaft (FIGURE 5). Notches are carried by the treadles X remote from the treadle shaft beneath the harnesses in vertical alignment therewith for attachment to the harnesses. A treadle roll is carried between each treadle intermediate the notches and the treadle shaft, and cams Y of substantially the same size are carried by the auxiliary cam shaft for engaging and operating the treadle rolls.

Weaving may be started by manipulation of a "Start" push button on a station of the "Loom Control Push Button Stations" and the protection system is arranged to operate on the first pick (FIGURES 1, 21 and 23). In both the normal stop and the panic stop it is desirable that the loom motor not be stopped, but rather that weaving be stopped by disengaging the clutch, so that upon starting weaving the loom motor will already be running to avoid undue strain on the motor. The position of the loom parts may be adjusted after discontinuance of weaving and with the motor running to any position by use of the "Jog" button alone for forward adjustments and by use of "Jog" and "Reverse" buttons for a reverse adjustment (FIGURES 21 and 23). The motor may be reversed eliminating the need for gearing for moving the loom in reverse.

THE LOOM

While a wide loom is illustrated in the drawings, it is to be understood that the novel features herein would have applicability to other looms and loom situations as well. The loom illustrated includes loom sides 10 and 11, and arch supports 10a and 11a which are bridged at the top by the arch 12 (see FIGURES 1, 4, 5 and 6). A pair of transversely spaced longitudinally extending wide flange beams 13 and 14 bridge the sides and offer support therefor at their base. The breast beam 15 is supported by longitudinally spaced transversely disposed samsons, such as the one illustrated at 16. A standard cloth roll-up motion, broadly designated at 17 is transversely spaced from the loom and an aisle is provided with a platform 18. The cloth 19 passes over a stationary guide member 20, around the roll 21, around the roll 22, and down beneath the roll 23, thence under the platform 18 to the take-up roll 24 which is provided with a cloth roll 25.

Driving means for the lay is provided in the form of a shaft A which is mounted for rotation and extends longitudinally between the loom sides 10 and 11, and which extends past the loom side 11 (FIGURE 6). Such drive shaft A is provided with a driving means B including a pulley 26 driven by a belt 27, which is driven by a pulley 28 carried by the power take-off shaft 29, from the motor broadly designated at 30. The motor has suitable mounting means including the bracket 30a for positioning same upon the base member 14.

LAY DRIVE

The shaft A is provided with a plurality of spaced pinions, such as illustrated at C in FIGURES 5 and 6, driving a plurality of spaced large gears D. The gears D are centrally mounted on first stub shafts E which are carried by spaced vertical supports or bearing stands 31. Each of the gears D carries an eccentrically mounted pin or second stub shaft F for carrying linkage G for connection with spaced lay supports or swords 32. The bearings 33 are provided for positioning the shaft A for rotation. Each of the lay swords is carried by a rocker shaft 34. The linkage G includes a first link 35 which has connection with a vertical intermediate link by the pivot 37. The intermediate link 36 is carried at its lower end for oscillation upon the shaft 38. A second substantially horizontal link 39 has pivotal connection as at 40 with the vertical intermediate member 36, and with its respective sword 32 by the pivot 41.

It is advantageous that the linkage G pass below the harnesses so that, in the case of a long lay as in the present wide loom, several intermediate supports can be provided to avoid a long unsupported span of the lay minimizing deflection of the lay facilitating true shuttle flight. On a narrow loom the supports may be moved inwardly of the lay ends beneath the harnesses minimizing deflection.

The linkage G has a minimum of vertical displacement below the harnesses because vertical movement of such is limited to the rise and fall of the arc described by the upper portion of the intermediate link 36. The eccentricity or "throw," the distance between the first stub shaft E and the second stub shaft F, results in vertical displacement of the link 35 of the linkage G which is outside the harnesses. The "throw" required has been reduced because the pivot 41 has been lowered so that inward movement thereof produces a greater inward movement of the lay than would occur if the pivot 41 were higher. The distance of the pivot 41 above the rocker shaft and the length of the link 36 is chosen so as to pass the link 39 below the harnesses and still clear the cam shaft 47. The "dwell" of the lay on the back center may be controlled by varying the length of the link 35 so as to afford dwell on the portion of the arcuate movement of the second stub shaft F remote from the lay supports to provide more time in which the shed is open.

Torque is reduced in the long drive shaft A because the long radius of the gear D acts as a lever arm reducing the amount of force which must be applied thereto by the pinion C for accomplishing the beat up. The first stub shaft E resists only lateral forces tending to produce translation thereof, while the shaft A resists torsion and small lateral forces. However, a conventional loom crankshaft must resist both lateral forces and increased torsion. Since torsion in the drive shaft is reduced, there will be less tendency to produce unequal displacement of the lay supports or swords as would twist the lay.

PROTECTION SYSTEM

The loom protection system includes a first sensing means H. The first sensing means contemplates a pair of pick-up or sensing units preferably, each positioned between the side of the warp shed outside the reed and a respective shuttle box. Each of these sensors includes a coil 42 wound about a magnetic core 43 (see FIGURES 1 and 2). The coil 42 is wound about a reel 42a which is fixed within a recess in the lay as by screws 42b. The magnetic core 43 may be firmly positioned within a hollow cylindrical bore 43a in the reel as by the setscrew 43b. When magnetic material in the shuttle passes adjacent either pick-up an electrical pulse is generated.

An element I (see FIGURES 4 and 6) in the form of an arm constructed of magnetic material is cyclically driven by the shaft E adjacent a second sensing or signal producing means J which is carried adjacent the loom by a bearing stand 31a for producing a second electrical signal or pulse as the arm moves adjacent thereto. The gears D which are carried by the spaced vertical supports 31 are mounted on shafts E. As illustrated at 44 in FIGURES 4 and 6, the shaft E on the motor end of the loom extends between two bearing stands 31 and 31a past the loom side 11. On the other end of the loom a shaft (not shown) is similarly positioned to operate a pick motion. Four gears D, and associated parts, are contemplated in the present embodiment, but two or more may be used depending upon the length of the lay and the support necessary. FIGURE 6 illustrates the alternate positioning of the linkage G, first on one side of a gear D, and then on the other side of the next gear D. A gear 45 is fixed with respect to the shaft portion 44, and in turn drives a gear 46 for driving the cam shaft 47. The arm I is carried outside the loom as illustrated in FIGURES 1, 4 and 6. The arm is adjustably fixed upon the shaft portion 44 by a setscrew 44a. The angular position of the arm may be adjusted on the shaft by loosening the setscrew. Such adjustment varies the position in the loom cycle at which the second or master signal responsive thereto is produced as would be desirable from style to style and loom to loom. The sensing means J (FIGURE 3) includes a coil 48 wound about a magnet 49. The coil is wound about a reel 48a which is fixed to the support 31a as by screws 48b. A magnet 49 is carried within the bore 49a of the reel 48a.

The means S including certain "Controller" elements (FIGURE 21) provides for actuating an electronic means M if the first or shuttle flight signal is not properly produced responsive to the first sensing means H prior to the second or master signal produced by the second sensing means J. Such would result in a panic stop as described in greater detail below.

The reliability and sensitivity of the protection system is increased because sensing is accomplished, rather than a mechanical movement requiring contact, to perform the function of actuating means for stopping weaving. This increase in sensitivity facilitates shuttle sensing on extreme positions of the lay for maximum protection.

CLUTCH-BRAKE

An electrical clutch K (FIGURE 7) includes a clutch plate 50 which is slidably mounted on splines 51. The splines are carried on an anular member 52 which is welded as at 53 to a separate portion 29a of the power take-off shaft 29. The clutch is also provided with coils 54 and is carried within a housing 55 provided with cooling fins 55a. The brake L includes a brake plate 56 which is also positioned upon the splines 51. The brake is provided with coils 57. The housing 55 has an end bell 55b. The brake plate 56 engages an annular member 58, which has fixed connection to the end bell as by screws 59, when exerting its braking action. The clutch plate 50 bears, when actuated, against an annular member or hub 60, which is welded as at 61, to a portion 29b of the shaft 29 within the motor 30. The integral hub presents an advantage over conventional clutch-brake units in that a coupling is avoided between the clutch disc and the motor shaft providing maximum strength where needed. Since the present construction requires a very short clutch if the clutch-brake is to be placed at this point in the drive in alignment with the motor, it would be difficult to provide a conventional coupling capable of resisting the torque in such limited space.

It will be noted that the separate portion of the power take-off shaft 29a is separated from the portion 29b by the space 62. The clutch plate 50 is provided with a spacer 63 threadably secured thereto, as at 64, for maintaining proper spaced relation between the clutch plate 50 and the brake plate 56. These plates move independently of each other, but must at all times be positioned very closely to the members 60 and 58, respectively, since they must make quick engagement as will be made more apparent later in the description. The separate portion 29a of the power take-off shaft 29 is carried within bearings 65 within the end bell 55b. The other portion 29b of the shaft 29 is mounted within a bearing 66 on one end thereof and within a bearing 67 on the other end. The bearing 66 is carried within the housing 55, since the motor 30 does not require a second end bell because of the novel positioning of the clutch and the brake elements. The housing 68 of the motor 30 has a flange 68a which is secured to a flange 55c of the housing 55 as by threaded fastening means 69. A cover 68b is provided for the electric motor. The motor includes coils 70 with iron cores 71 and an armature 72 which has removable connection with the power take-off shaft portion 29b. Electronic means M (FIGURE 21) including the "Panic Stop Pulse Generator" is provided for momentarily overexciting the coils of the brake while the coils of the clutch are de-energized as described in greater detail below.

Thus, the clutch-brake element is positioned on the power take-off shaft, which is the position of lowest torque so as to minimize the retarding force necessary. Such retarding force as is necessary is applied quickly and in substantial amount because of the overexcitation of the brake coil. The only mechanical movement required is that of the clutch plate and the brake plate which are positioned for quick response upon a minimum of movement responsive to an electrical rather than a mechanical signal of the faulty condition.

FILLING DETECTOR

Referring now especially to FIGURES 8, 9 and 10, a first contact means N includes a filling grate 73 carrying a pair of contacts 74 and 75. Such are illustrated as being of the type which are spring biased toward open position, and are held normally closed by the magnet 76, also carried by the filling grate. A filling fork including a pair of tines 77 is adapted to enter the slots 73a of the filling grate 73 in the absence of filling 78. The switch contacts 74 and 75 are carried within a glass envelope 79. Such assemblies are known as reed switches and are described on pages 118 through 121 in an article in Machine Design magazine dated Dec. 19, 1963, published by the Penton Publishing Company of Cleveland, Ohio. The reed switch assembly is wired as at 80 within an opening 73c within the filling grate. The magnet 76 is suitably secured together with the reed switch as by glue 73b within the opening 73c.

The grate 73 is carried by a bracket 81 which is attached at 82 to the lay. The filling fork 77 is pivotally carried by the block 83 upon a bracket 84 within a bifurcated portion 84a. The bracket 84 is secured as at 85 to the breast beam 15. A broken end of filling 78 is illustrated at 78a and, when the filling grate advances with the lay, permits the tines 77, constructed of magnetic material, to enter the filling grate so as to affect or to distort the magnetic field of the magnet 76 which normally holds the contacts of the reed switch assembly 79 closed. This disturbing of the magnetic field results in opening of the contacts 74 and 75. The tines affect the magnetic field by offering an easier path than air for the flux lines to draw the flux lines away from the contacts so reducing the magnetic force holding the contacts closed as to allow their inherent spring bias to open them. FIGURES 9 and 10 illustrate the tines in operating position in solid lines. The dotted line position of the tines in FIGURE 10 shows the tines normally held out of operative relationship by the filling 78.

The means S including certain "Controller" elements (FIGURE 21) provides for actuating the electronic means M, in the absence of proper filling responsive to actuation of the first contact means N, to produce a panic stop as described in greater detail below.

Since the present filling detector does not require mechanical linkage for response to actuation thereof, the operating components may be entirely enclosed to avoid lint fouling. The operating components may be actuated while enclosed by magnetic action. If desired, the elements defining the slots 73a in the grate may be omitted to minimize the possibility of lint fouling the fork action. If desired only one time-like element could be used in lieu of the fork. Wear is minimized and reliability of response is assured.

TRANSFER FEELER

A second contact means O (see FIGURES 11, 12 and 13) includes contacts 86 and 87. Such contacts are illustrated as being spring biased toward open position, but are held closed by a magnet 88. The contacts 86 and 87 are part of the assembly enclosed by the glass envelope 89 of a reed switch of the type described above. The magnet and reed switch are carried within a housing 90 which is fixed to a bracket 91 as at 91a. The bracket is secured to the loom side 10 as at 92 adjacent the breast beam 15. A housing 93 contains mounting means for a feeler 94 including a pair of spaced members 95 and 96 which are mounted for rotation. The end of the feeler remote from the feeler tip 97 is biased by the spring 98 toward dotted line position in FIGURE 12.

If sufficient filling 78 is on the bobbin 99, the feeler will assume the position shown in solid lines in FIGURE 12. In normal position the magnet 88 holds the contacts closed. However, if sufficient filling is not present, the feeler will slip to solid line position, as illustrated in FIGURE 12, causing the magnet 88, carried thereby by magnetic attraction since the feeler 94 is constructed of magnetic material, to move in the direction of the arrow in FIGURE 13 to permit the contacts 86 and 87 to open to initiate the change cycle described in greater detail below. Thus, the magnetic field is affected by movement to permit inherent spring bias to open the contacts. It will be noted that the magnet slides within a slot 90a, and that the contact assembly 89 is positioned within a recess 90b within the housing. The assembly 89 is wired within the housing as by the wires 89a to electrically connect the contacts in a circuit described in greater detail below, and to fasten the assembly 89 within the recess 90b. The contact means O is positioned adjacent the left-hand shuttle box 100, while the transfer operation takes place adjacent the opposite shuttle box 101 (see FIGURE 1).

It will be noted that the feeler 94 extends through the usual slot 100a in the box front 100b. The usual binder 100c is provided opposite the box front 100b for receiving the shuttle 102.

Such transfer feeler avoids lint fouling, does not wear excessively, and is always reliable and positive, since magnetic action controls operating components which may be enclosed.

SHUTTLE BOXING DETECTOR

A third contact means P (FIGURES 14, 15 and 16) includes a housing 103 carried by a mounting plate 104 which has fixed connection to the lay as by bolts 105. The housing 103 is secured to the mounting plate at at 104a. As the shuttle 102 is boxed the binder 101a is displaced outwardly urging the head 106 of the threaded member 107 outwardly to move the link element 108 from dotted line position in FIGURE 14 in a clockwise direction about the pivot 109 against the force of the spring 108a to solid line position. The spring 108a is fastened to the link 108 on one end as at 108b and to a post 104b at the other end. A lock nut 107a is provided for securing the threaded element 107 in a proper adjusted position.

The housing 103 has a top plate 103a connected as by the screw 103b to a lower housing portion having a recess 103c therein. The recess contains an assembly 110 which carries a pair of contacts 111 and 112, which are spring biased toward open position, but which are held closed by a magnet 113 fixed as by glue 113a within a recess 103d within the housing 103. The assembly 110 is wired as at 110a and fixed within the recess 103c as by glue 110b. When the element 108, constructed of magnetic material, moves between the magnet 113 and the contacts 111 and 112 the field of the magnet is affected by drawing away flux lines to the easier path through the element 108 so as to permit the contacts to be returned to normally open spring biased position.

TRANSFER MECHANISM INCLUDING THREAD CUTTER RETRACTOR

A thread cutter 114 (FIGURES 17 and 18) is slidably carried upon a bracket 115. The bracket is carried upon a rod 116 by an adjustable bracket means 117 positioned thereon. The rod 116 is carried adjacent the bracket portion 118 of the battery, broadly designated at 119.

The bunter 120 is pivotally connected to the transferrer 121 as by the pivotal connection 122. The transferrer is carried for oscillation upon the rod 116 and is normally biased by the spring 123 to raised position. Electromagnetic means Q actuates the bunter through upward movement of its plunger 120a responsive to actuation of the second contact means O and continues to hold the bunter 120 in striking position provided the contact means P is operated within a predetermined time after operation of the second contact means O. An arm 124 is fixed as at 125 to the bunter 120 and, when the bunter is raised by the solenoid plunger 120a, the arm 124 is moved downwardly in the direction of the arrow. On this occasion the arm 124 engages a latch arm 127 to raise the latch 128 to release the housing 129 which carries the thread cutter including the blades 114. The housing 129 is slidably urged forwardly by the spring 130 and the cutter blades 114 are opened by the cam 131 to dotted line position in FIGURE 18.

If the shuttle boxed switch P has been operated within such predetermined time, the striking arm 126 carried by the lay engages the bunter 120, which causes the transferrer 121 to move downwardly to transfer the bobbin. The solenoid Q is then deenergized retracting the plunger 120a.

Flexible means R, including a flexible chain 132, has connection on one end thereof as at 133 with the housing 129. Other flexible means, such as a cable could be used in lieu of the chain. The chain passes forwardly of the sprocket 134 mounted for rotation on the bracket 115. The chain 132 has connection with a coil spring 135 adjacent the other end thereof as at 136. The spring 135 has connection as at 137 with the lay to reduce wear on the chain, thread cutter and associated parts by dampening the effects of jerking action by the lay. The cutter blades 114 are closed by the cam 131 responsive to rearward movement of the cutter housing 129. Thus, many mechanical components of the usual transfer mechanism and thread cutter retractor have been eliminated in favor of the present more effective structure.

In operation, if the shuttle boxed switch or third contact means P has not been operated within such predetermined time, as will be described in greater detail below, the solenoid Q is deenergized permitting the dropping of the plunger 120a and the bunter 120 aborting the change. The arm 124 rotates in a clockwise direction to normal position. The means S including certain "Controller" elements (FIGURE 21) provides for actuating the electronic means M to produce a panic stop.

LAY STRUCTURE

The lay structure (FIGURES 19 and 20) includes an elongated member T having a substantially H shaped cross-section. The member T has spaced upper vertical flange members 138 and 139. A seat portion 140 is provided with an intermediate inner portion of the flange member 139. A longitudinal laterally movable member U is carried between the flange members. A complementary seat 141 is formed within the laterally movable member U opposite the seat 140 for confining the lower frame member 142 of a reed 143. A removable means V includes an "Allen" screw 144, carried within an internally threaded bore 138a within the flange 138 for urging the movable member U into position for confining the reed within the lay without the aid of a reed cap. A jam nut 145 fixes the screw 144 in such position for confining the reed. A race plate 146 is provided for traversing thereon by the shuttle.

Such configuration of the lay permits convenient positioning of the sensors of the second sensing means H as the screws 42b fasten the same to the web 139a between the flanges 138 and 139 (FIGURES 2 and 8). The lower flanges 138b and 139b, together with the upper flanges and the web provide great rigidity and effectively resist any forces tending to produce deflection introduced thereon by the lay drive mechanism. Such configuration permits the construction of a lay having low mass and yet facilitates true shuttle flight on the conveniently positioned race plate.

TREADLE MOUNTING

Referring again to FIGURE 5, it will be observed that the treadle shaft W is positioned substantially directly beneath the fell 147. The treadle shaft W is adjacent the rocker shaft 34 and the treadles X have notches 148 for connection to the jack sticks 149. The jack sticks connect the harnesses 150 therewith to form a uniform, well defined, shed 151. The auxiliary cam shaft 152 is positioned forwardly of the cam shaft 47 and is driven therefrom through the idler gears 154 carried upon suitable supports 153 (FIGURE 1) through gears 155.

The cams 156 may be of uniform size and ride upon respective treadle rolls 157 for moving the respective harnesses the amounts necessary to provide a uniform and true shed with symmetrical shuttle flight in either direction. If the shed were not symmetrical more drag upon the shuttle would be exerted by the warp in one direction than the other, slowing the shuttle in one direction so as to require compensation in the protection system. Thus, asymmetrical shuttle flight characteristics would be undesirable because of the added complexities introduced. A symmetrical shed is obtained by the particular positioning of the treadle shaft W beneath the fell 147 so that the displacement of the harnesses required to produce proper shed opening is in substantially straight line proportion to the displacement of that portion of the treadles X beneath the harnesses. The harnesses are carried at the top by the arch 12 and sheave 158 carried on the usual spring top loom arrangement (not shown).

LOOM OPERATION

Referring now especially to FIGURES 1, 4, 5 and 6, during weaving the gear 46 drives the cam shaft 47 on which the pick cam 159 is mounted. The pick cam, through the pick ball 160 operates the picking motion including the pick shaft 161. The pick shaft operates through the lug strap 162 to move the picker stick 163 in the parallel motion 164 to propel the shuttle back and forth across the loom.

The positioning of various control means, manual and automatic, will now be discussed briefly. The various "Loom Control Push Button Stations" 165 (FIGURE 21) are spaced along the arch 12 of the loom to give the operator ample access to use same. The "Controller" elements 167 are carried by the outside portion of the arch support 11a. The "Brake Release Push Buttons" 166 are positioned, respectively, upon the outside upper portion of the arch support 10a and upon the rear of the "Controller" 167. Power from the "Plant Power" supply is introduced into the "Combination Rerversing Starter" 168, which is carried by the "Controller" 167. The "Filling Monitor Light" 169 is positioned upon the "Controller" and the "Warp Brake Monitor Light" 170 is also carried nearby upon the "Controller" 167. In addition to the sensing means described above, a warp brake detector including a drop wire 171 is provided for engaging a contact 172 to actuate the warp brake stop circuit as described below.

CONTROL SYSTEM

The block diagram of FIGURE 21 illustrates the functional relationships between the manual controls, the sensing or signalling devices and the inputs therefrom. Solid state components, incorporated in what is known as a logic circuit, are employed in the embodiment of the invention illustrated, to perform electronic functions responsive to certain inputs for initiating response by various mechanical components which are also illustrated therein. The circuit components will be described in greater detail below, but it is deemed best to begin with a general description.

The voltage from any of the loom "Start" push buttons, on any of the stations 165 which carry operator actuated devices, causes the "Start Signal Pulse Generator," a component for producing a pulse of relatively short duration, to produce one short duration pulse each time the push button is pressed (FIGURE 21). This pulse is used to activate the "Clutch-Brake Control" and to turn off either of the monitor lights if on. The "Clutch-Brake Control" contains a memory component receiving the signal and being so conditioned thereby as to normally continuously energize the driving means, and receiving a signal produced responsive to faulty loom operation and being so conditioned thereby as to deactivate the driving means. A pulse of short duration is preferred so as to permit the protection circuits to operate on the first pick even though the loom "Start" push button may still be depressed by the operator. This also permits delay of clutch K engagement long enough for the brake L to disengage. This will be explained in greater detail below.

The "Start" signal pulse causes the "Clutch-Brake Control" to energize the clutch and deenergize the brake. A stop signal from: a loom "Stop" push button on a station 165, a button of the "Brake Release Push Buttons," a loom "Reverse" push button, a "Stop" button of the "Combination Reversing Starter" 168, the "Run-Safe" button of the "Combination Reversing Starter" in "Safe" position, or the "Warp Break Stop Circuit" causes the "Clutch-Brake Control" to effect a normal stop deenergizing the clutch L. A stop signal from the "Panic Stop Pulse Generator" not only causes the "Clutch-Brake Control" to deenergize the clutch and apply normal stop voltage to the brake, but also applies a panic stop or overexciting voltage or short duration to the brake.

A signal from the "Broken Filling Stop Circuit," "Shuttle Flight and Master Signal Comparer" or the "Bobbin Change or Stop Decision Circuit" causes the "Panic Stop Pulse Generator" to produce a short duration pulse. This pulse not only goes to the "Clutch-Brake Control" to deenergize the clutch and energize the brake, but also causes momentary overexcitation of the brake coil for the duration of such pulse, producing a faster than normal stop.

A signal from the "Second Sensing Means" may be compared with a signal from the "First Sensing Means," caused by the shuttle passing over the "Left and Right Shuttle Sensors." This is accomplished by the "Shuttle Flight and Master Signal Comparer." If the shuttle passes over both sensors of the "First Sensing Means" before the occurrence of the signal from the "Second Sensing Means" the loom continues to run. If the signal from the "Second Sensing Means" occurs after the shuttle has passed over one of the sensors of the "First Sensing Means" but not the other, a panic stop signal is sent to the "Panic Stop Pulse Generator."

If both filling forks N fail to detect proper filling, a signal is sent to the "Broken Filling Stop Circuit." This circuit sends a panic stop signal to the "Panic Stop Pulse Generator," and turns on the "Filling Monitor Light" 169. This light stays on until the loom is restarted.

The "Warp Break Detector" 171 and 172, as described in greater detail below, may actuate a memory component of the "Warp Break Stop Circuit" such that when the signal from the "Second Sensing Means" J occurs, a normal stop signal is sent to the "Clutch-Brake Control." This results in weaving being stopped with the harness level. The "Warp Break Monitor Light" 170 is also turned on. This light stays on until the weaving is resumed.

When the "Feeler" O detects low filling on the bobbin a signal is sent to the "Bunter Solenoid Timer" and thence to the "Bobbin Change or Stop Decision Circuit." The setting of this timer determines how long the bunter will be held in position to be struck by the lay for a normal bobbin change.

When the "Bunter Solenoid Timer" is activated the signal therefrom is fed to the "Bunter Solenoid" O to energize it. However, if after the elapse of a predetermined time period following occurrence of a signal from the "Second Sensing Means," a signal from the "Shuttle Boxed Switch" P has not been received by the "Bobbin Change or Stop Decision Circuit" a panic stop signal is sent to the "Panic Stop Pulse Generator" and the "Bunter Solenoid" is deenergized. Thus, the bobbin change is aborted and the shuttle stops under the bobbin change mechanism thus avoiding a pick with no filling.

The "Combination Reversing Starter" 168 has push buttons and a selector switch for control of the motor 30. It is the power disconnect, supplying power to the loom from "Plant Power" responsive to an operator throwing the "Handle," and contains the main fuse protection. The "Run-Safe" selector switch allows the motor to run when in the RUN position, but prohibits it from running in the SAFE position. In the SAFE position certain components of the control system can be operated for testing or adjustment. The "Start" push button starts the motor of the "Run-Safe" selector switch is in RUN position. This constitutes a safety feature for the operator since such switch must be placed in RUN position before the loom can be started. The "Stop" button may cause stopping of the motor and energization of the brake. Thermal elements and overload contacts OL are contained for the protection of the motor. If the overload contacts open because of excessive motor current they can be reclosed by pressing the "Reset" button. A "Power Supply" for the logic components supplies power through a "Control Transformer" from the "Combination Reversing Starter" 168. The "Control Relays" work with the "Combination Reversing Starter" 168 to facilitate reversing of the motor as will be decribed in greater detail below.

The pressing of a "Jog" button of a station 165 results in energization of the clutch and deenergization of the brake only as long as depressed. The loom control "Reverse" push button operates through the "Control Relays" to cause the "Combination Reversing Starter" to reverse the motor 30. All "Start" push buttons of stations 165 are disconnected while the "Reverse" push button is depressed. If the "Jog" push button is depressed while the "Reverse" push button is depressed the loom parts will move backwards. This will permit the operator to precisely position the lay to any desired position without making another pick. If the "Reverse" push button is depressed while the loom is running mechanism will respond as though the "Stop" push button had been depressed and then the motor will reverse.

A number of identical, spaced "Loom Control Push Button Stations" 165 are provided for the convenience of operators. There are two identical "Brake Release Push Button Stations" 166, and depressing either of these push buttons releases the brake to permit turning the loom by hand. The "Start" push buttons are disconnected while a button of the "Brake Release Push Buttons" is depressed. If such is momentarily depressed while the loom is running, the loom will respond as though a "Stop" push button had been depressed. However, if such button is held down the loom coasts to a stop because the brake is disconnected.

Referring now to FIGURE 22, which illustrates a Norpak panel layout, the logic circuit, the components thereof may be of a type listed and described in a manufacturer's manual such as the current Norpak Static Control Application Manual, published by the Square D Company of Milwaukee, Wis., except those specifically identified. Certain binary logic circuits use a logic signal system, such as described in the Square D manual, wherein "1" and "0" are used to designate all signals as described. All signals are here designated as being of two such types, either "1" or "0." For example, if a transistor is conducting its output is considered to be a "0" and if not conducting its output is considered to be a "1." Such designations may be arbitrarily selected, but in the present embodiment those used in the manual have been followed. Outputs of certain NOR components are normally held to a "0" by the application of a permanent "1" signal to their inputs as illustrated in FIGURE 22. Such permanent "1" signals are signals from a suitable "Power Supply."

Now follows a detailed description of the electronic circuitry and automatic and operator actuated controls with primary reference to FIGURE 22, but with reference to FIGURES 23 and 24, and reference back to FIGURE 21.

*"Start signal pulse generator"*

An AC start signal from a "Start" push button of a station 165 is fed to a Signal Converter E111. A DC logic signal "1" is fed to NORE E61 (terminal 1). NORS E61 and E62, resistor modules E66 (terminal 1) and E66 (terminal 3), and the capacitor 6 CAP connected to mounting TB 2 (terminal 12) and mounting TB 3 (terminal 12), make up a standard single shot multivibrator such as described in bulletin R–1046.2–94 dated Aug. 15, 1962, published by the Square D Company. Such single shot multivibrator produces only one output "1" pulse of predetermined duration each time it receives an input "1" regardless of the duration of such input. The duration of the output "1" pulse is essentially determined by the value of the associated capacitance and resistance (internal and external). The single shot multivibrator comprises the "Start Signal Pulse Generator." The "1" output is fed from NOR E62 (terminal 9) to NORS E51 (terminal 1), E54 (terminal 3) and E59 (terminal 1) and OR diode D8 connected to mounting TB 2 (terminal 1) and TB 3 (terminal 1). Thus, a start signal or pulse of relatively short duration is fed from the "Start Signal Pulse Generator" to the "Clutch-Brake Control," the "Broken Filling Stop Circuit" and the "Wrap Break Stop Circuit" (FIGURE 21).

*"Clutch brake control"*

An Off-Return Memory, for controlling the clutch and brake is made up of NORS E1 and E52. As set forth below, these determine whether the clutch or the brake will be energized. The "Clutch-Brake Control" comprises the Off-Return Memory and NORS E53, E54, and E75, resistor modules E76, output amplifiers E2, E3 and E4, and the associated components illustrated in FIGURE 24 discussed below.

When "Plant Power" is first applied to the loom the output of NOR E51 (terminal 9) becomes a "1" because of the action of an "Off" pulse supplied from the logic "Power Supply" such as Square D's 8851–P1. Such "Power Supply" also furnishes the necessary voltages for operation of all logic circuits illustrated herein. An "Off" pulse (a short duration "1") is applied to certain transistors to insure that their output is a "0" immediately after applying power to a system before any input signals are applied so that the components thereof will be in normal stopped position ready to give properly responsive action to input signals. The "1" output from NOR E51 (terminal 9) is fed to NORS E53 (terminal 1), E54 (terminal 1) and the reset module E90 (terminal 3). The output of NOR E53 (terminal 9) is a "0" which permits an AC Output Amplifier E3 to energize an AC transformer T1 (FIGURE 24) which applies a normal stop AC voltage to the rectifier 2 REC and thence to the brake. The output of NOR E54 (terminal 9) is a "0" which is fed to NOR E75 (terminal 1). The output of NOR E75 (terminal 9) is a "1" which prevents the AC Output Amplifier E2 for energizing the rectifier 1 REC and the clutch. The "1" to the power or reset module E90 (terminal 3) resets the Transfer Memory E93. The purpose of this reset pulse "1" is to insure that the "Shuttle Flight and Master Signal Comparer" is in a condition indicating that the shuttle is boxed as will be described in greater detail below.

When the "Start" signal "1" from the "Start Signal Pulse Generator" is fed to NOR E51 (terminal 1) the above memory component is turned "On" and the output of NOR E51 (terminal 9) becomes a "0" and stays in this condition until any stop signal is applied to NOR E52 (terminal 1). When the output of NOR E51 (terminal 9) so becomes a "0," the output of NOR E53 (terminal 9) becomes a "1." This "1" deactivates the AC Output Amplifier E3 and thus releases the brake. The output of NOR E54 (terminal 9) would become a "1" so as to activate the clutch through NOR E75 and output amplifier E2 were it not prevented from doing so by the "Start" signal "1" which is applied to NOR E54 (terminal 3). After the occurrence of the "Start" signal, the output of NOR E54 (terminal 9) becomes a "1" which causes the output of NOR E75 (terminal 9) to become a "0" and the AC Output Amplifier E2 to energize the clutch through 1 REC. The "Start" signal "1" which is applied to NOR E54 (terminal 3) provides the time delay needed to let the brake release before the clutch engages. When terminal 3 of the reset module E90 goes to "0" because the output of NOR E51 (terminal 9) has become a "0" the transfer memory components E93 can operate as described below.

The above described Off-Return Memory or bi-stable electronic memory component in conjunction with NORS E53, E54 and E75 insure that either the brake or the clutch will be energized, but not both simultaneously.

When any stop signal "1" is applied to the OR circuit made up of diodes D1, D2, and D3, such is fed to NOR E52 (terminal 1) which turns "Off" the previously described Off-Return Memory. When such memory is turned off the output of NOR E51 (terminal 9) again becomes a "1" which causes release of the clutch and a normal stop braking action. The action of such stop signals will now be described. An AC stop signal from the "Run-Safe" switch or the "Stop" push button or an overload contacts OL (FIGURE 23) of the "Combination Reversing Starter," a push button of the "Brake Release Push Buttons" 166, or a "Reverse" button or a "Stop" button of a station 165, is fed to the signal converter E112. A DC logic signal "0" (the loom stop circuit described above is normally closed and when operated opens and goes from a "1" to a "0") is fed to NOR E55 (terminal 1). The output "1" of NOR E55 (terminal 9) is fed to OR diode D1. The stop signal "1" from the "Panic Stop Pulse Generator" is fed to OR diode D2, and the stop signal "1" from the "Warp Break Stop Circuit" is fed to OR diode D3.

*"Panic Stop Pulse Generator"*

Any panic stop signal "1" applied to the OR circuit made up of diodes D4, D5 and D6 is fed to NOR E63 (terminal 1). NORS E63 and E64, resistor modules E66 (terminal 5) and E66 (terminal 7), and the capacitor 7 CAP connected to mounting TB 2 (terminal 5) and mounting TB 3 (terminal 5) make up a standard single shot multivibrator similar to the one described above. The diodes D4, D5 and D6, single shot multivibrator and NOR E65 comprise the "Panic Stop Pulse Generator." Normally, the output of NOR E64 (terminal 9) is a "0" and the output of NOR E65 (terminal 9) is a "1" which prevents the AC output amplifier E4 (which may be such as Square D's 8853 SCR amplifier) from energizing a panic stop rectifier 3 REC.

When a panic stop signal "1" is applied to NORE E63 (terminal 1) of the "Panic Stop Pulse Generator" the resulting panic stop pulse "1" is fed from the "Panic Stop Pulse Generator" from the output of NOR E64 (terminal 9) to NOR E65 (terminal 1) which causes the output of NOR E65 (terminal 9) to become a "0." While this "0" is present the AC output amplifier E4 energizes the rectifier 3 REC to produce the DC overexcitation voltage for the brake for a faster than normal stop. After the panic stop pulse "1" has ended the output of NOR E64 (terminal 9) becomes a "0" and the output of NOR E65 (terminal 9) becomes a "1" which deenergizes AC output amplifier E4, which removes the overexcitation voltage leaving the normal brake voltage from AC output amplifier E3. A DC brake coil is chosen because of its quick response characteristics. This panic stop voltage should be of sufficient amplitude to produce maximum braking torque in the shortest possible time and of duration sufficient to effect stoppage of the loom without damage to the brake coil. The panic stop signal "1" is also fed to OR diode D2 to turn "Off" the Off-Return Memory in the "Clutch Brake Control."

The duration of the panic stop pulse "1" determines how long the overexcitation voltage is applied to the brake coil 57.

*"Shuttle Flight and Master Signal Comparer"*

The signal from the "Left Shuttle Sensor" is fed through an input noise filter made up of a resistor 3 RES and a capacitor 4 CAP and on to the input of NOR E510 (terminal 7). The signal from the "Right Shuttle Sensor" is fed through a similar filter including the resistor 4 RES and capacitor 5 CAP and on to the input of NOR E512 (terminal 7). Terminal 7 of NORS E510 and E512 are sensitive terminals and a relatively low voltage "1" can cause a "0" output from their terminals 9. Thus, NORS E510 and E512 are both used as signal amplifiers. Each such NOR has its terminal 1 connected to common (permanent "0") and when the "Magnetic Material On Shuttle" 102a is not moving in the magnetic field of either sensor, then terminal 7 of each such NOR is also a "0." Therefore, the output of each NOR is a "1" and the outputs of NORS E511 (terminal 9) and E513 (terminal 9) are both "0." When the shuttle moves within the magnetic field of either pickup, then the low voltage pulse thus generated causes the output terminals 9 of NORS E510 and E512 to become a "0." This "0" causes the output of NOR E511 (terminal 9) or NOR E513 (terminal 9) to become a "1" depending upon the position of the shuttle.

Each time either shuttle sensor detects the passage of the shuttle NOR E511 (terminal 9) or NOR E513 (terminal 9) sends a "1" through the OR circuit made up of diodes D9 and D10 to a standard single shot multivibrator made up of NORS E71 and E72, resistor modules E76 (terminal 1), E76 (terminal 3) and E66 (terminal 9), and the capacitor 8 CAP. Resistor module E66 (terminal 9) is used to obtain additional resistance and a permanent "1" to produce an output "1" pulse of sufficient duration with sufficiently short recovery time to permit one such one shot multivibrator to be used instead of two. The output pulse "1" of this single shot multivibrator is just long enough to insure that if the shuttle sensors detect more than one piece of magnetic material on the shuttle that spurious signals would not be sent to transfer memory E93. For example, referring to FIGURE 11, a standard shuttle includes several pieces of magnetic material such as the tips 102b, the eye 102c or the bobbin grip assembly 102d any of which might ordinarily be detected in addition to the relatively large piece of magnetic material 102a (FIGURE 21) placed in the base of the shuttle to insure that a signal is received. In any event, the first magnetic material detected produces the signal as described herein. The normal output of NOR E72 (terminal 9) is a "0" and the output of NOR E514 (terminal 9) is a "1." When the passage of the shuttle causes NOR E72 (terminal 9) to become a "1" then the output of NOR E514 (terminal 9) becomes a "0." A transfer memory E93 reverses outputs when its input goes from a "1" to a "0." Hence, the NOR E514 inverts the signal which permits the transfer memory E93 to change on the "leading edge" of the pulse created by the shuttle instead of the "trailing edge" thereof, affording more time for engaging the brake and disengaging the clutch.

Transfer memory E93 is reset by the "1" applied to reset module E90 (terminal 3) any time the loom is not running. When the loom is running a "0" is applied to E90 (terminal 3) and transfer memory E93 can function. The reset "1" causes output terminal E93 (terminal 1) to be a "1" and output terminal E93 (terminal 9) to become a "0." When the reset has become a "0," each time the input terminal (terminal 5) of E93 goes from a "1" to a "0" the output terminals change states, that is, on the first "1" to "0" change E93 (terminal 1) becomes a "0" and E93 (terminal 9) becomes a "1." When the input goes from a "0" to a "1" there is no output change. However, on the next input "1" to "0" change the outputs return to their initial states, that is, E93 (terminal 1) is a "1" and E93 (terminal 9) is a "0." This process is repeated as long as the input alternates. The output terminal E93 (terminal 1) is a "1" any time the loom is not running because of the reset "1" applied to E90 (terminal 3). When the loom is started and the shuttle is first picked it must cross one of the shuttle sensors and cause a "1" to "0" change at the input terminal E93 (terminal 5) which causes output E93 (terminal 1) to become a "0." When the shuttle crosses the next sensor or pickup there is another "1" to "0" change at input E93 (terminal 5) and output E93 (terminal 1) becomes a "1." Therefore, any time the shuttle is outside the shed output E93 (terminal 1) is a "1" and any time the shuttle is in flight between the pickups output E93 (terminal 1) is a "0." Output E93 (terminal 1) is fed to the input of NOR E57 (terminal 3) as described below.

The output or master signal of the "Second Sensing Means" is fed through an input noise filter made up of 1 RES and 3 CAP connected to the input of NOR E56

(terminal 7). This NOR is a signal amplifier and operates similarly to NORS E510 and E512 for the shuttle pickups. Thus, the output of NOR E56 (terminal 9) goes to "0" each time the "Cyclically Driven Element" I passes the "Second Sensing Means" J. The output of NOR E56 (terminal 9) is fed to the input of NOR E57 (terminal 1). Thus, the output of NOR E57 (terminal 9) would tend to send a "1" to the panic stop OR diode D4 on each pick were it not for the signal applied to the input of NOR E57 (terminal 3) produced responsive to shuttle passage. The output of transfer memory E93 (terminal 1) is fed to NOR E57 (terminal 3) and this output is a "1" when the shuttle is outside the shed and a "0" when the shuttle is in flight within the shed (between the sensors of the first sensing means H). The "1" output from NOR E56 (terminal 9) keeps the output of NOR 57 (terminal 9) on a "0" except when the "Cyclically Driven Element" is passing the "Second Sensing Means." However, if at this time the shuttle is outside the shed the "1" applied to the input of NOR E57 (terminal 3) keeps the output of NOR E57 (terminal 9) on a "0" and weaving continues. If for some reason the shuttle is "running late" when the "Cyclically Driven Element" passes the "Second Sensing Means," then the output of NOR E56 (terminal 9) goes to a "0" and the input of NOR E57 (terminal 3) is also a "0," then the output of NOR E57 (terminal 9) becomes a "1" and a panic stop results. The "Shuttle Flight and Master Signal Comparer" comprises the noise filters, NORS E510, E511, E512, E513, diodes D9 and D10, the single shot multivibrator, NOR E514, reset module E90 (terminal 3) transfer memory E93 and NORS E56 and E57.

Terminal 1 of the transfer memory E93 is by design inherently capable of changing its output only on a "1" to "0" change of the input signal from the shuttle sensors. It is necessary to eliminate or mask all signals which might be detected from magnetic pieces carried by the shuttle other than one as described above. This masking is accomplished by the single shot multivibrator having its output on NOR E72 (terminal 9) because such a component is capable of delivering only one pulse of specified duration regardless of other input signals received during the duration thereof. A component is chosen producing a pulse of sufficient duration to insure that all magnetic material on the shuttle passes a given sensor without producing another signal in a single passage thereof. The signal from NOR E72 (terminal 9) goes from "1" to "0" only on the trailing edge thereof so that by inverting this signal through the action of NOR E514 a "1" to "0" change is produced on the leading edge thereof on NOR E514 (terminal 9). NOR E57 (terminal 9) will produce a "1" (panic stop signal) if both of its inputs are simultaneously a "0," however, if either of its inputs is a "1" its output will be a "0" so that the loom will continue weaving. While a "0" remains on the memory component E93 (terminal 1), indicating that the shuttle is in flight between sensors one of the two "0" signals required to produce a "1" output from NOR E57 (terminal 9) is supplied. However, the other input from the second sensing means J is a "1" preventing NOR E57 (terminal 9) from producing a "1" until the "Cyclically Driven Element" I passes means J for producing the other "0" signal which would produce a panic stop. If prior to this last mentioned "0" the output of the memory component E93 (terminal 1) becomes a "1" means J is rendered ineffective for causing cessation of weaving through a panic stop. The last mentioned "1" will be produced by the leading edge of the signal from NOR E514 (terminal 9) indicating that the shuttle has arrived at the point on the lay where the second sensor of the first sensing means H is located prior to a predetermined position of the loom cycle indicated by a signal from the second sensing means J.

Thus, the logic component NOR E57 constitutes a means causing a signal produced by the first means H occurring prior to the signal produced by the second means J to render the last mentioned signal ineffective to cause a cessation of weaving during a given cycle of weaving.

It is possible to sense on extreme positions on the lay since a signal caused by the first sensing means is compared with a pulse caused by the second sensing means avoiding the necessity of relying on mechanical action to close a switch operated responsive to a cyclically driven loom part. It is possible to stop the loom if the shuttle is not out of the shed by sensing in an extreme forward position in the loom cycle by using a signal derived as set forth above to overexcite the coils of a brake carried with a clutch on the loom motor power take-off shaft.

"Broken Filling Stop Circuit"

The two filling fork switches are normally open and are held closed as described above and are wired in parallel between mounting TB 5 (terminal 7) and common. This holds the input of NOR E58 (terminal 1) and panic stop OR diode D5 at a "0." The filling must be absent from both filling forks when the lay moves forward to cause a panic stop.

When both switches have opened "Permanent 1" (supplied by the power supply) is fed through resistor 2 RES to the input of NOR E58 (terminal 1) and panic stop OR diode D5. Therefore, an Off-Return Memory made up of NORS E58 and E59 turns "On" and causes output amplifier E8 to turn on the "Filling Fork Monitor Light." This "1" also causes a panic stop.

The Filling Fork Monitor Light stays on until the loom is restarted. This "Start" pulse is applied to the input of NOR E59 (terminal 1) which turns "Off" the associated Off-Return Memory. The "Broken Filling Stop Circuit" comprises the input resistor 2 RES, the Off-Return Memory and the amplifier E8.

"Warp Break Stop Circuit"

The warp break detectors are normally open, and "permanent 1" is fed through the resistor 5 RES to the input of the Timer E121 (terminal 1). This Timer may be such as Square D's A30507–251–50 timer. Normally, the output of Timer E121 (terminal 7) is a "1" and the output of Timer E121 (terminal 10) is a "0." The Off-Return pulse from the power supply is fed through OR diode D7 to the input of Timer E121 (terminal 3) to insure that the Timer outputs are in normal condition when the system power is first applied. The loom start pulse is fed through OR diode D8 to reset the Timer when the loom is restarted after a warp break.

When there has been a warp break the detector connects mounting TB 5 (terminal 10) to common which puts a "0" on the input of Timer E121 (terminal 1). If this signal does not last as long as the timing period set on the Timer there is no change in the outputs of the Timer. The timing period is set just long enough to prevent accidental stops from the normal incidental movement of the detectors during weaving. However, if this "0" lasts longer than the timing period, the outputs will change states. Timer output E121 (terminal 7) becomes a "0" and Timer output E121 (terminal 10) becomes a "1." This condition lasts until the input of Timer E121 (terminal 1) returns to a "1" and there has been a short "1" pulse applied to the input of Timer E121 (terminal 3) as described above.

The output of Timer E121 (terminal 10) is fed to Output Amplifier E11. When this output becomes a "1" the "Warp Break Monitor Light" is turned on and stays on until the loom is restarted. The output of Timer E121 (terminal 7) is fed to NOR E515 (terminal 3) and this "1" normally keeps the output of NOR E515 (terminal 9) at a "0." The output of the second sensing means signal amplifier NOR E56 (terminal 3) is fed to the input of NOR E515 (terminal 1). The output of NOR E56 (terminal 9) is normally a "1" and goes to "0" each time the "Cyclically Driven Element" (arm I) passes the "Second Sensing Means" J. If the output of Timer E121 (terminal 7) has gone to "0" because of a warp break, the next "0" from NOR E56 (terminal 9) will permit the output of NOR E515 (terminal 9) to become a "1." This "1," with the lay approaching front center, is fed to the normal stop OR diode D3 which causes a normal stop which requires such time to accomplish as to be consumated with the harnesses approximately level. It is desirable that the harnesses be in this position to facilitate location of the damaged portion of the warp 147 (FIGURE 5) and repair thereof.

The "Warp Brake Stop Circuit" comprises input resistor 5 RES, diodes D7 and D8, Timer E121, NOR E515 and output amplifier E11.

Thus, a memory component E121 receives a signal from the warp detector 171 and 172 responsive to a faulty warp providing an output signal indicating a faulty warp of sufficient duration to extend until a signal is produced by the second sensor J. A logic component E515 receives the signal indicating a faulty warp and the signal from the second sensor J changing condition responsive thereto, to produce a signal terminating weaving.

*"Bunter Solenoid Timer"*

The transfer feeler mechanism O is arranged such that when the filling is low on the bobbing a permanent magnet is moved near a normally closed switch causing it to open as described above. This switch is connected between the mounting TB 5 (terminal 9) and common and normally a "0" is fed to the input of NOR E519 (terminal 1). When the filling is low, and the switch is opened the permanent "1" connected to TB 4 (terminal 9) is fed through the resistor 7 RES to turn on an Off-Return memory made up of NORS E518 and E519. Normally, the output of NOR E518 (terminal 9) is a "1" and is fed to the input of NOR E516 (terminal 5) and reset module E90 (terminal 7). E90 (terminal 7) is the reset for the E96 module of this Transfer Memory. Normally, the output of NOR E519 (terminal 9) is a "0" and is fed to the input of Timer E101 (terminal 1), and the input of NOR E520 (terminal 1).

When the Off-Return memory made up of NORS E518 and E519 has been turned "On" because there is low filling, the outputs of NORS E518 (terminal 9) and E519 (terminal 9) change states. The "1" output from NOR E519 (terminal 9) starts the timing period of the Timer E101 and causes the output of NOR E520 (terminal 9) to become a "0." This "0" permits the AC Output Amplifier E13 to energize the Bunter Solenoid Q and lift the bunter 120 (FIGURE 18) into the striking position. After the timing period the output of Timer E101 (terminal 9) becomes a "1" and is fed through OR diode D11 to the input of NOR E519 (terminal 1). This "1" turns the Off-Return Memory "Off" and the outputs of NORS E518 (terminal 9) and E519 (terminal 9) return to their normal states and the Bunter Solenoid is de-energized. The "Bunter Solenoid Timer" comprises the input resistor 7 RES, the Off-Return Memory, Timer E101, diodes D11 and D12, NOR E520 and Amplifier E13.

Thus, a memory component in the form of the Off-Return Memory NORS E518 and E519 receives the signal indicating a low supply of filling responsive to the feeler of the second contact means O and means in the form of the Timer 101 operated in conjunction therewith holds the bunter in operable position for a predetermined time.

*"Bobbin Change or Stop Decision Circuit"*

If the shuttle is not properly boxed, it is necessary to prevent the bobbin change from taking place. In addition, the loom should be stopped to prevent a pick without filling.

The shuttle boxed switch P, spring biased open, is held normally closed against the force of the spring by a bias permanent magnet. When the shuttle is properly boxed an element constructed of magnetic material is moved by the binder into position to shunt the magnetic field away from the switch to let it open as described above. This switch is connected between mounting TB 5 (terminal 8) and common and normally a "0" is fed to the input of NOR E516 (terminal 3). When the shuttle is properly boxed the "permanent 1" connected to mounting TB 4 (terminal 8) is fed through resistor 6 RES to the input of NOR E516 (terminal 3). This signal holds the output of NOR E516 (terminal 9) to a "0" when the shuttle is boxed.

Normally, the input of NOR E516 (terminal 5) is a "1" because the Off-Return Memory, made up of NORS E518 and E519, is "Off." Also, the input of NOR E516 (terminal 1) is a "1" because the output of Transfer Memory E96 (terminal 1) is held in the reset condition by the "1" applied to the reset module E90 (terminal 7). However, when the Off-Return Memory made up of NORS E518 and E519 is turned "On" the input of NOR E516 (terminal 5) and reset module E90 (terminal 7) goes to "0." The output of Transfer Memory E96 (terminal 1) remains a "1" until the input to Transfer Memory E96 (terminal 5) has made a "1" to "0" change. The "1" from the output of Transfer Memory E96 (terminal 1) holds the output of NOR E516 (terminal 9) to a "0."

Normally, the output of the "Second Sensing Means" Signal Amplifier NOR E56 (terminal 9) is fed to the input of NOR E517 (terminal 1). Each time the "Cyclically Driven Element" I passes the sensor J the output of NOR E517 (terminal 9) becomes a "1" which is fed to the input of NOR E73 (terminal 1). A variable pulse width Single Shot Multivibrator is made up of NORS E73 and E74, and resistor modules E76 (terminal 5) and E76 (terminal 7), variable resistor P1 which is connected to a "permanent 1," and the capacitor 9 CAP. Such pulse must be of sufficient duration to permit the shuttle to box after the pulse is initiated by actuation of the second sensing means J. A variable resistor P1 is provided in lieu of the fixed resistor of a standard single shot multivibrator to make this multivibrator produce an output pulse whose duration is adjustable to compensate for loom characteristics which vary from loom to loom. On each pick this Single Shot Multivibrator sends a short duration "1" to the input of Transfer Memory E96 (terminal 5). However, nothing happens to the outputs of Transfer Memory E96 because of the reset "1" applied to the reset module E90 (terminal 7).

If the Off-Return Memory made up of NORS E518 and E519 is "On" because of low filling, the trailing edge of the next pulse from the Single Shot Multivibrator made up of NORS E73 and E74 will cause the outputs of Transfer Memory E96 to change states and the input of NOR E516 (terminal 1) becomes a "0." If the shuttle is boxed properly at this time the input of NOR E516 (terminal 3) is a "1" and the output of NOR E516 (terminal 9) is held to a "0." If, however, the shuttle is not boxed properly the input of NOR E516 (terminal 3) is a "0" and the output of NOR E516 (terminal 9) becomes a "1." This "1" is fed to panic stop OR diode D6 to cause a panic stop. This "1" is also fed to an OR diode D12 to turn "Off" the Off-Return Memory made up of NORS E518 and E519 to release the Bunter Solenoid.

The "Bobbin Change or Stop Decision Circuit" comprises the input resistor 6 RES, NOR E516, NOR E517, the multivibrator, reset module E90 (terminal 7) and the transfer memory E96.

Thus, the memory component including NORS E518 and E519 upon receiving a signal that the shuttle is not in the proper position in the weaving cycle for a filling change deactivates the solenoid Q for releasing the bunter. The Timer 101 operates in conjunction with the memory component releasing the bunter if no signal is received by the memory component indicating that the shuttle is not in the proper position beneath the bobbin change mechanism. Since NOR E516 requires simultaneous "0" inputs from each of three sources; the output of the Off-Return Memory E518 (terminal 9), the output of transfer memory E96 (terminal 1) and the shuttle boxed switch P in order to reduce a "1" (panic stop) output; the timely application of a "1" signal from the switch P will prevent a panic stop even though that the other "0" signals are applied responsive to actuation of the transfer switch O and the second sensing means J. Thus, in order to carry out a bobbin change operation the transfer switch O must indicate the need for a filling change, the second sensing means J must signal the proper position in the loom cycle and the shuttle boxed switch P must indicate proper boxing prior to the second sensing means J so signalling.

"Controls"

Referring now to FIGURE 23, the manual controls are illustrated in greater detail. Plant AC power is fed through the "Combination Reversing Starter" containing fuses FU to the control transformer T2 and through contacts F1 for forward rotation of the motor or through contacts R1 for reverse rotation of the motor and through thermal elements OL for over-current protection of the motor. The control transformer T2 steps the plant power voltage down for control purposes and distributes same to mounting TB1 (terminals 1 and 2) through fuse 3FU and for distribution to the control system as illustrated. The motor control circuit is a standard 3-wire stop-start control circuit to relay 1CR of the "Control Relays" with certain additions or modifications set forth below.

If the Motor Stop Push Button of the "Combination Reversing Starter" 168 is closed and the Run-Safe switch is in the Run position, pressing the Motor Start Push Button energizes relay 1CR and closes the holding contact thereof in parallel with the Start Push Button to hold the coil thereof energized. The other normally open contact of relay 1CR is closed providing power through relay contacts 2CR and normally closed contacts F1 and R1 to energize either coil associated with the contacts F1 or R1 to operate the motor.

A "Run-Safe" switch to permit the protection control circuits to be energized for testing but preventing the motor from running is provided.

Starter coil F1 is energized when relay 1CR is energized if relay 2CR is deenergized. This runs the motor in the forward direction.

Reversing relay coil 2CR of "Control Relays" is energized by pushing any of the reverse push buttons. Normally, closed contacts thereof in the coil circuit of F1 open to deenergize F1 to stop the motor from running in the forward direction. Normally closed contacts in the coil circuit of R1 and F1, respectively, open to insure that normally open contacts thereof cannot be closed at the same time. When relay coil 2CR is energized the normally open contacts thereof close to run the motor in the reverse direction. Releasing the reverse push button deenergizes the coil 2CR permitting the motor to stop and restart in the forward direction.

The normally closed overload contacts OL protect the motor in either the forward or reverse direction.

The circuitry controlling the clutch and brake can be operated when the "Run-Safe" switch is in the RUN position only if the motor is running which insures that the motor cannot be started under load. If the "Run-Safe" switch is moved from SAFE to RUN the same action takes place as would result from having pushed a loom "Stop" push button on a station 165, and a loom "Start" push button must be pushed after starting the motor to operate the loom.

The loom stop circuit is normally closed except to stop. It is made through the "Stop" push button of the "Combination Reversing Starter," normally open holding contacts 1CR, the "Run-Safe" switch, the loom "Stop" push buttons of a station 165, the "Reverse" push buttons, and the "Brake Release Push Buttons" to signal converter E112. This circuitry is similar to a 3-wire stop-start control circuit. The circuitry for the "Start" buttons of the "Loom Control Push Button Stations" can be operated if the stop circuit is closed. The start circuit connects to signal converter E111.

The normally closed "jog" push button contacts open the brake circuit when operated. The normally open "jog" push button contacts provide AC voltage to mounting TB1 (terminal 4) which energizes the clutch. Therefore, if the loom is stopped and the motor is running, operating any jog push button will cause the loom to run as long as the button is held down. If the reverse push button is operated and then the jog push button, the loom will run backwards.

The "Brake Release Push Buttons" open the loom stop circuit to prevent the loom from being started while an operator is positioning the loom by hand. The "Brake Release Push Buttons" also open the circuit to the brake.

Referring now especially to FIGURE 24, the Clutch-Brake Rectifier wiring is illustrated. All three rectifiers may be such as Radio Receptor part number C11S5B 1S16 manufactured by General Instrument Corp., Newark, N.J. These rectifiers are full-wave single phase bridge rectifiers. The clutch circuit is a standard circuit using a DC capacitor 1 CAP as a filter and the clutch is connected between mounting TB1 (terminals 7 and 8). The AC voltage is switched "On" or "Off" of the rectifier 1 REC by the AC output amplifier E2 or a jog push button connected to mounting TB1 (terminal 4) through the fuse 1FU. The brake circuit is similar to the clutch circuit in that it uses a DC capacitor 2 CAP as a filter and the brake is connected between mounting TB1 (terminals 9 and 10). It is different, however, in that the two rectifiers, 2 REC and 3 REC, have their DC outputs connected in parallel. However, each rectifier is supplied from a separate AC source. For normal stops 2 REC is supplied from an AC transformer T1. The AC voltage is switched "On" or "Off" to the transformer by the output amplifier E3 through fuse 2FU. The normal stop brake voltage is relatively low compared to the panic stop voltage. For panic stops 3 REC is supplied with the higher voltage which is switched "On" or "Off" of 3 REC by output amplifier E4. While certain switch components have been described herein as being in the normally open or normally closed positions, revisions could be made to make them operable in the reverse positions.

While a preferred embodiment of the invention has been described using specific terms, such description is for illustrative purposes only, and it is to be understood that changes and variations may be made without departing from the spirit or scope of the following claims.

What is claimed is:

1. For use in a loom having a driven shaft extending longitudinally of the loom, a drive for a lay having a support including, a plurality of spaced pinions carried by said driven shaft intermediate its ends, a relatively large gear mounted for rotation and being driven by each pinion, a plurality of spaced longitudinally disposed first stub shafts for so mounting said large gears, a second stub shaft carried eccentrically by each large gear, a first substantially horizontal link pivotally carried adjacent one end thereof by each second stub shaft, a substantially vertical intermediate link for each large gear pivotally carried adjacent its lower end and pivotally connected adjacent its upper end to the other end of said first link for each intermediate link, a second substantially horizontal link pivotally carried adjacent one end thereof by said upper end of each said intermediate link, and a pivotal connection between the other end of said second links and said lay support.

2. A drive for a lay having a support therefor including, a driven shaft extending longitudinally of the loom, a plurality of spaced pinions carried by said driven shaft intermediate its ends, a plurality of spaced relatively large gears driven by said pinions, a plurality of spaced longitudinally disposed first stub shafts for carrying said large gears, a second stub shaft extending outwardly from each of said large gears and being carried eccentrically thereon on the side thereof remote from said first stub shaft, and linkage means carried adjacent one end thereof by said stub shaft and being connected on the other end thereof to the lay support.

3. For use in a loom having a lay, a shuttle and cyclical driving means therefor, a protection device including, a pair of first spaced elements carried by the lay each generating an electrical impulse, means carried by the shuttle causing an electrical impulse to be generated by said spaced elements as the shuttle moves adjacent each of said elements during a weaving cycle, a second element carried in fixed position adjacent the loom generating an electrical impulse, means cyclically moved adjacent said second element responsive to said cylical driving means causing an electrical impulse to be generated by said second element as said means cyclically moved moves adjacent said second element, means causing a cessation of loom operation responsive to the impulse generated by said second element, and means causing an impulse from the second of said first spaced elements encountered by the shuttle during a weaving cycle occurring prior to said impulse generated by said second element to render said last mentioned impulse ineffective to cause a cessation of loom operation.

4. For use in a loom having a lay, a shuttle and cyclical driving means therefor, a protection device including, a pair of first spaced elements carried by the lay each generating an impulse, means carried by the shuttle causing an impulse to be generated by said spaced elements as the shuttle moves adjacent each of said elements during a weaving cycle, a second element carried in fixed position adjacent the loom generating an impulse, means cyclically moved adjacent said second element desponsive to said cyclical driving means causing an impulse to be generated by said second element as said means cyclically moved moves adjacent said second element, means causing a cessation of loom operation responsive to the impulse generated by said second element, and means causing an impulse from the second of said first spaced elements encountered by the shuttle during a weaving cycle occurring prior to said impulse generated by said second elements to render said last mentioned impulse ineffective to cause a cessation of loom operation.

5. For use in a loom for weaving having a lay, a yarn carrier moving back and forth with respect to the lay and cylical driving means therefor, a protection device including a first means carried by the lay for producing an electrical signal as the yarn carrier moves adjacent thereto, a cyclically driven element moved responsive to said cylical driving means, a second means carried adjacent the loom producing an electrical signal as said element moves adjacent thereto, means causing a cessation of weaving responsive to the electrical signal produced by said second means, and means causing an electrical signal produced by said first means occurring prior to said electrical signal produced by said second means to render said last mentioned electrical signal ineffective to cause a cessation of weaving during a given cycle of weaving.

6. For use in a loom for weaving having a lay, a yarn carrier moving back and forth with respect to the lay and cyclical driving means therefore, a protection device including, a first means carried by the lay for producing a signal as the yarn carrier moves adjacent thereto, a cyclically driven element moved responsive to said cyclical driving means, a second means carried adjacent the loom producing a signal as said element moves adjacent thereto, means causing a cessation of weaving responsive to the signal produced by said second means, and means causing a signal produced by said first means occurring prior to said signal produced by said second means to render said last mentioned signal ineffective to cause a cessation of weaving during a given cycle of weaving.

7. In a loom having a lay with a support, a shuttle with a filling supply, an electric motor for driving the loom from a power take-off shaft extending therefrom, a shuttle binder and transfer means including a bunter and thread cutter, the improvement including, a drive shaft extending longitudinally of the loom, a driving means carried on one end of said shaft, a plurality of spaced pinions carried by said drive shaft, a plurality of spaced relatively large gears driven by said pinions, a plurality of spaced longitudinally disposed first stub shafts for carrying said large gears, a second stub shaft extending outwardly from each of said large gears and being carried eccentrically thereon, linkage means connecting said second stub shafts and said lay support, a first means carried by the lay for producing a first signal as the shuttle moves adjacent thereto, an element driven by said drive shaft, a second means carried adjacent the loom producing a second signal as said element moves adjacent thereto, an electrical clutch having coils and a clutch plate carried by said power take-off shaft normally energized for connecting the motor in driving relation to the loom, said power take-off shaft being divided so that a separate portion thereof drives the drive shaft, an electrical brake having coils and a brake plate carried by said power take-off shaft normally deenergized but engageable upon energization to resist rotation of said separate portion of the power take-off shaft, electronic means for momentarily overexciting the coils of the brake and for deenergizing the coils of the clutch, a pair of contacts opening and closing in response to a magnetic field carried by the lay, a feeler held in retracted position by the filling but moving in the absence of filling to affect said magnetic field, a second pair of contacts opening and closing in response to a second magnetic field, a feeler moving in one path when sufficient filling supply is present and in another path when the filling needs replenishing affecting said second magnetic field, a third pair of contacts opening and closing in response to a third magnetic field, an element normally moved by the binder to affect the third magnetic field within a predetermined time after actuation of the second pair of contacts, electromagnetic means actuating the bunter provided the third contacts are actuated within a predetermined time, flexible means connected on one end to the thread cutter and on the other end to the lay for returning the thread cutter after operation thereof, and means actuating said electronic means if said first signal is not produced prior to said second signal, or in the absence of filling, or if the shuttle is not boxed within a predetermined time after actuation of said second contacts.

8. In a loom having a lay support and reed carried thereby, a shuttle with a filling supply moving through a warp shed having a fell, an electric motor for driving the loom from a power take-off shaft extending therefrom, a shuttle binder and transfer means including a bunter and thread cutter, the improvement including, a lay having an elongated longitudinal member having a substantially H-shaped cross-section, means confining the reed within the upper portion of said longitudinal member, a treadle shaft carried in substantially vertical alignment with the fell, a drive shaft extending longitudinally of the loom, a driving means carried on one end of said shaft, a plurality of spaced pinions carried by said drive shaft, a plurality of spaced relatively large gears driven by said pinions, a plurality of spaced longitudinally disposed first stub shafts for carrying said large gears, a second stub shaft extending outwardly from each of said large gears and being carried eccentrically thereon, linkage means connecting said second stub shafts and said lay support, a first means carried by the lay for producing a first signal as the shuttle moves adjacent thereto, an element driven by said drive shaft, a second means carried adjacent the loom producing a second signal as said element moves adjacent thereto, an electrical clutch having coils and a clutch plate carried by said power take-off shaft normally energized for connecting the motor in driving relation to the loom, said power take-off shaft being divided so that a separate portion thereof drives the drive shaft, an electrical brake having coils and a brake plate carried by said power take-off shaft normally deenergized but engageable upon energization to resist rotation of said separate portion of the power take-off shaft, electronic means for momentarily overexciting the coils of the brake and for deenergizing the coils of the clutch, a pair of contacts opening and closing in response to a magnetic field carried by the lay, a feeler held in retracted position by the filling but moving in the absence of filling to affect said magnetic field, a second pair of contacts opening and closing in response to a second magnetic field, a feeler moving in one path when sufficient filling supply is present and in another path when the filling needs replenishing affecting said second magnetic field, a third pair of contacts opening and closing in response to a third magnetic field, an element normally moved by the binder to affect the third magnetic field within a predetermined time after actuation of the second pair of contacts, electromagnetic means actuating the bunter provided the third contacts are actuated within a predetermined time, flexible means connected on one end to the thread cutter and on the other end to the lay for returning the thread cutter after operation thereof, means actuating said electronic means if said first signal is not produced prior to said second signal, or in the absence of filling, or if the shuttle is not boxed within a predetermined time after actuation of said second contacts.

9. For use in a loom having an electric motor and a power take-off shaft extending therefrom for driving the loom, the combination including, means carried by the loom producing an electrical signal when faulty loom operation occurs, an electrical clutch coil, a clutch plate carried by said shaft with said clutch coil normally energized for connecting the motor in driving relation to the loom, said power take-off shaft being divided so that a separate portion thereof drives the loom, an electrical brake coil, a brake plate carried by said shaft with said brake coil normally deenergized but said brake plate being engageable with said separate portion of the power take-off shaft to stop same upon energization of said brake coil, and means responsive to said electrical signal for momentarily overexciting the coil of said electrical brake and for deenergizing the coil of said electrical clutch, said overexciting being followed by normal energization.

10. For use in a loom having a motor and a power take-off shaft extending therefrom for cyclically driving the loom, the combination including, first cyclically operated sensing means carried by the loom producing a first pulse when faulty shuttle action occurs, second means carried by the loom producing a second pulse indicating the desirability of stopping the loom for another cause, a clutch having a clutch plate carried by said shaft normally engaged for connecting the motor in driving relation to the loom, said power take-off shaft being divided so that a separate portion thereof drives the loom, a brake having a brake plate carried by said shaft normally disengaged but being engageable with said separate portion of the power take-off shaft to stop same, and means responsive to said first pulse for exerting a relatively high braking force upon the brake and for disengaging the clutch and responsive to said second pulse for exerting a lower braking force upon the brake and for disengaging the clutch.

11. For use in a loom having an electric motor and a power take-off shaft extending therefrom for driving the loom, the combination including, means carried by the loom producing an electrical signal when faulty loom operation occurs, an electrical clutch coil, a clutch plate carried by said shaft with said clutch coil normally energized for connecting the motor in driving relation to the loom, said power take-off shaft being divided so that a portion thereof separate from a motor portion drives the loom, an integral hub carried by the motor portion of said power take-off shaft, said clutch plate being slidably carried on said separate portion of said power take-off shaft and being engageable and disengageable with said hub responsive to said coil, an electrical brake coil, a brake plate carried by said separate shaft portion with said brake coil normally deenergized but said brake plate being engageable with said separate portion of the power take-off shaft to stop same upon energization of said brake coil, and means responsive to said electrical signal for momentarily overexciting the coil of said electrical brake and for deenergizing the coil of said electrical clutch, said overexciting being followed by normal energization.

12. For use in a loom having an electric motor and a power take-off shaft extending therefrom for driving the loom, the combination including, means carried by the loom producing an electrical signal when faulty loom operation occurs, an electrical clutch coil, a clutch plate carried by said shaft with said clutch coil normally energized for connecting the motor in driving relation to the loom, said power take-off shaft being divided so that a separate portion thereof drives the loom, an electrical brake coil, a brake plate carried by said shaft with said brake coil normally deenergized but said brake plate being engageable with said separate portion of the power take-off shaft to stop same upon energization of said brake coil, and electronic means responsive to said electrical signal for converting said signal to a signal of predetermined duration, means amplifying said signal of predetermined duration, and electronic switching means applying said signal of predetermined duration to said brake coil for momentarily overexciting the coil of said electrical brake.

13. A filling detector for a loom having a lay comprising, switching elements including, a pair of contacts opening and closing in response to a magnetic field carried by the loom, a magnetic field the sufficiency or insufficiency of which effects said opening and closing, and a feeler carried by the loom, at least one of said switching elements being positioned upon the lay, relative movement between the switching elements responsive to movement of the lay being affected by the presence or absence of proper filling, said relative movement in the absence of proper filling affecting said magnetic field, and means bringing about a change of loom operation responsive to contact action resulting from such affecting of the magnetic field in the absence of proper filling.

14. A filling detector for a loom having a lay comprising, switching elements including, a pair of contacts opening and closing in response to a magnetic field carried by the loom, a magnetic field the sufficiency or insufficiency of which effects said opening and closing, and a pivoted feeler carried by the loom the pivotal movement of which being limited by the filling when in proper position, at least one of said switching elements being positioned upon the lay, said feeler moving in the absence of filling in proper position to affect said magnetic field, and means bringing about a cessation of weaving responsive to contact action resulting from such unlimited pivotal movement of said feeler.

15. A filling detector for a loom having a lay comprising, a pair of spaced units each having switching elements including, a pair of contacts opening and closing in response to a magnetic field carried by the loom, a magnetic field the sufficiency or insufficiency of which effects said opening and closing, and a feeler carried by the loom, at least one of said switching elements being positioned upon the lay, relative movement between the switching elements responsive to movement of the lay being affected by the presence or absence of proper filling, said relative movement in the absence of proper filling affecting said magnetic field, one of said units being positioned adjacent each end of the lay, and means bringing about a cessation of weaving responsive to contact action resulting from such affecting of the magnetic field in the absence of proper filling.

16. A filling detector for a loom having a lay comprising, switching elements including, a reed switch carried by the loom including a pair of contacts opening and closing in response to a magnetic field, a magnetic field the sufficiency or insufficiency of which effects said opening and closing, a pivoted feeler carried by the loom the pivotal movement of which being limited by the filling when in proper position, at least one of said switching elements being positioned upon the lay, said feeler moving in the absence of filling in proper position to affect said magnetic field, and means bringing about a cessation of weaving responsive to contact action resulting from such unlimited pivotal movement of said feeler.

17. A transfer actuating device for a loom having a lay and a filling carrier on the lay including, a housing carried in fixed position with respect to the loom, a feeler carried by the housing moving responsive to a sufficiency and insufficiency of filling on the carrier so as to indicate when the filling needs replenishing, a pair of contacts opening and closing in response to a magnetic field, a magnetic field the sufficiency or insufficiency of which effects said opening and closing, said feeler when indicating that the filling needs replenishing affecting said magnetic field so as to accomplish contact action, and means initiating transfer responsive to contact action resulting from such latter movement of said feeler.

18. A transfer actuating device for a loom having a lay and filling carrier on the lay including, a housing carried in fixed position with respect to the loom, a feeler carried by the housing moving in one path when sufficient filling is on the carrier and in another path when the filling needs replenishing, a reed switch having a pair of contacts opening and closing in response to a magnetic field, a magnetic field the sufficiency or insufficiency of which effects said opening and closing, by said feeler when moving in another path when the filling needs replenishing affecting said magnetic field so as to accomplish contact action, and means initiating transfer responsive to contact action resulting from such latter movement of said feeler.

19. A device for detecting improper shuttle boxing in a loom having a shuttle box carried by the lay including a binder which is moved outwardly to a given position when the shuttle is properly boxed comprising, a housing fixed with respect to the lay, a movable element carried by the housing, resilient means normally urging said element into engagement with the binder, a pair of contacts opening and closing in response to a magnetic field carried by the housing, a magnetic field the sufficiency and insufficiency of which effects said opening and closing, said element being moved by said binder into position to affect said magnetic field, and means bringing about cessation of loom operation responsive to contact action resulting from movement of said element.

20. A device for detecting improper shuttle boxing in a loom having a shuttle box carried by the lay including a binder which is moved outwardly to a given position when the shuttle is properly boxed comprising, a housing fixed with respect to the lay, an element moved responsive to binder movement, a pair of contacts opening and closing in response to a magnetic field, a magnetic field the sufficiency and insufficiency of which effects said opening and closing, said element being moved by said binder into position to affect said magnetic field, and means bringing about a cessation of loom operation responsive to contact action resulting from movement of said element.

21. A device for detecting improper shuttle boxing in a loom having a shuttle box carried by the lay including a binder which is moved outwardly to a given position when the shuttle is properly boxed comprising, a housing fixed with respect to the lay, an element moved responsive to engagement by the binder when the binder is in said given position, a reed switch having a pair of contacts opening and closing in response to a magnetic field, a magnetic field the sufficiency and insufficiency of which effects said opening and closing, said element being moved by said binder into position to affect said magnetic field, and means bringing about a cessation of loom operation responsive to contact action resulting from movement of said element.

22. For use with a transfer mechanism having a thread cutter movably carried by a bracket fixed with respect to a loom having a lay, means carried by the bracket for urging said thread cutter forwardly into yarn cutting position, flexible means connected adjacent one end to the thread cutter and on the other end adjacent the lay, means supporting said flexible means carried in fixed relation to the bracket about which said flexible means passes, and resilient yieldable means connected to the flexible means between the lay and the thread cutter.

23. In a transfer mechanism having a bunter, a thread cutter movably carried by a bracket fixed with respect to a loom having a lay, the improvement including, a solenoid for moving the bunter into operable position, means for urging said thread cutter forwardly into yarn cutting position responsive to solenoid operation, flexible means connected adjacent one end to the thread cutter and adjacent the other end to the lay, and means supporting said flexible means carried in fixed relation to the bracket about which said flexible means passes.

24. In a loom having spaced harnesses manipulated for producing a warp shed having a fell, said loom having a lay, a yarn carrier moving back and forth with respect to the lay and cyclical driving means therefor, the improvement including, a treadle shaft in substantially vertical alignment with the fell, a shaft positioned rearwardly of said treadle shaft, treadles carried by the treadle shaft, means carried by said treadles remote from the treadle shaft beneath the harnesses in vertical alignment therewith for attachment to the harnesses, cams of substantially the same size carried by the shaft positioned rearwardly of said treadle shaft operating said treadles, a first means carried by the lay for producing a signal as the yarn carrier moves adjacent thereto, a cyclically driven element moved responsive to said cyclical driving means, a second means carried adjacent the loom producing a signal as said element moves adjacent thereto, means causing a cessation of weaving responsive to the signal produced by said second means, and means causing a signal produced by said first means occurring prior to said signal produced by said second means to render said last mentioned signal ineffective to cause a cessation of weaving during a given cycle of weaving.

25. A loom lay structure for accommodating a reed having a longitudinal lower frame member comprising, an elongated longitudinal member having a substantially H-shaped cross-section, said member having spaced upper vertical flange members, a longitudinal laterally movable member carried between said flange members, a seat formed by said laterally movable member and the opposite flange forming a confining support for the lower frame member of the reed, and releasable means forcing said laterally movable member against said lower frame member confining same within the seat.

26. A loom lay structure for accommodating a reed having a longitudinal lower frame member comprising, an elongated longitudinal member having a substantially H-shaped cross-section, said member having spaced upper vertical flange members, a seat within an intermediate portion of the inner portion of one of said flange members, a longitudinal laterally movable member carried between said flange members, a complementary seat within said laterally movable member opposite said first mentioned seat forming a confining support for the lower frame member of the reed, releasable means forcing said laterally movable member against said lower frame member confining same within the seat, and a race plate across the top of the other flange and laterally movable member.

27. A protection device for a loom having driving means therefor including, an operator actuated device for normally energizing said driving means, means producing a signal responsive to faulty loom operation for deenergizing said driving means, a component for producing a signal of relatively short duration upon actuation of said operator actuated device, and a memory component receiving said signal of relatively short duration and being so conditioned thereby as to normally continuously energizing said driving means, and receiving said signal produced responsive to faulty loom operation and being so conditioned thereby as to deactivate said driving means.

28. A protection device for a loom having a clutch brake drive including, an electrical circuit for energizing selectively the clutch and the brake, an operator actuated device in said circuit normally operable upon actuation by an operator to energize the clutch, an electrical signal normally operable to energize the brake produced responsive to faulty loom operation, an electrical component in said circuit producing a signal of relatively short duration upon actuation of said device by an operator, and a bi-stable electrical element in said circuit receiving said signal of relatively short duration to normally continuously energize said clutch and receiving said electrical signal produced responsive to faulty loom operation for energizing the brake.

29. For use in a loom for weaving having a shuttle with a plurality of spaced magnetic elements thereon moving back and forth on a path during weaving, the improvement including, sensing means positioned adjacent said shuttle so as to produce a pulse as a magnetic element moves adjacent thereto on its path during weaving, a component for producing a signal of given duration responsive to a magnetic element moving adjacent thereto, said signal being of sufficient duration to permit passage of all the magnetic elements on that particular flight of the shuttle during same, said component being incapable of producing another signal during the duration of said signal, and a logic component, capable of changing its condition responsive to each signal received thereby, receiving said signal.

30. For use in a loom with a weaving cycle having a yarn carrier with a supply of filling thereon, a protection device including, a signal producing device actuated responsive to a low supply of filling yarn on the yarn carrier indicating a need for placing a new supply of filling yarn on the yarn carrier, a signal producing device actuated at a predetermined point in the weaving cycle, a signal producing device actuated responsive to the yarn carrier arriving at a predetermined position for placing a new supply of filling yarn thereon, and a logic component normally receiving the above mentioned signals which, upon failure of actuation of the signal producing device responsive to the yarn carrier, said logic component will change state to produce a signal terminating weaving.

31. For use in a loom with a weaving cycle having a yarn carrier with a supply of filling thereon, a protection device including, a signal producing device actuated responsive to a low supply of filling yarn on the yarn carrier indicating a need for placing a new supply of filling yarn on the yarn carrier, a signal producing device actuated at a predetermined point in the weaving cycle providing a signal of predetermined duration, a signal producing device actuated responsive to the yarn carrier arriving at a predetermined position for placing a new supply of filling yarn thereon, and a logic component normally receiving the above mentioned signals so that upon termination of said signal of predetermined duration and upon failure of actuation of the signal producing device responsive to the yarn carrier, said logic component will change state to produce a signal terminating weaving.

32. For use in a loom with a weaving cycle having a yarn carrier with a supply of filling thereon, a protection device including, a signal producing device actuated responsive to a low supply of filling yarn on the yarn carrier indicating a need for placing a new supply of filling yarn on the yarn carrier, a signal producing device actuated at a predetermined point in the weaving cycle providing a signal of predetermined duration, a signal producing device actuated responsive to the yarn carrier arriving at a predetermined position for placing a new supply of filling yarn thereon, a logic component normally receiving the above mentioned signals so that upon termination of said signal of predetermined duration and upon failure of actuation of the signal producing device responsive to the yarn carrier, said logic component will change state to produce a signal for terminating weaving, a motor having a power take-off shaft, a clutch and brake on said power take-off shaft through which the motor drives the loom, and means responsive to said signal for terminating weaving for disengaging the clutch and engaging the brake.

33. For use in a loom having harnesses for manipulating a warp during the weaving cycle of the loom, a protection device including, a warp detector actuated responsive to a faulty warp to produce a signal, a signal producing device normally actuated at a predetermined point in each weaving cycle, a memory component receiving said signal from the warp detector responsive to a faulty warp providing an output signal indicating a faulty warp of sufficient duration to extend until a signal is produced by said device normally actuated at a predetermined point in each weaving cycle, and a logic component, which upon receiving said signal indicating a faulty warp and said signal produced by said device normally actuated at a predetermined point in each weaving cycle, changes condition responsive thereto to produce a signal terminating weaving.

34. For use in a loom having harnesses for manipulating a warp during the weaving cycle of the loom driven through a clutch and brake, a protection device including, a warp detector actuated responsive to a faulty warp to produce a signal, a signal producing device normally actuated at a predetermined point in each weaving cycle, a first memory component receiving said signal from the warp detector responsive to a faulty warp providing an output signal indicating a faulty warp of sufficient duration to extend until a signal is produced by said device normally actuated at a predetermined point in each weaving cycle, a logic component, which upon receiving said signal indicating a faulty warp and said signal produced by said device normally actuated at a predetermined point in each weaving cycle, changes condition responsive thereto producing a signal for terminating weaving, and a second memory component receiving said signal for terminating weaving so as to deenergize the clutch and energize the brake.

35. For use in a loom with a weaving cycle having a shuttle moving back and forth on a path during weaving, the improvement including, a pair of spaced sensing means each positioned adjacent said shuttle path so as to produce a signal as said shuttle moves adjacent same on its path during weaving, a signal producing device actuated for producing a signal at a predetermined point in the weaving cycle, a memory component receiving the signals from said pair of spaced sensing means producing a signal indicative of the position of the shuttle with respect to said spaced sensing means, and a logic component receiving said signal indicative of the position of the shuttle and said signal at a predetermined point in the weaving cycle effective to bring about a cessation of weaving if the shuttle is in a predetermined position when the signal at a predetermined point is received.

36. For use in a loom with a weaving cycle having a shuttle, with a plurality of spaced magnetic elements carried thereon, moving back and forth on a path during weaving, the improvement including, a pair of spaced sensing means each positioned adjacent said shuttle path so as to produce a signal as said shuttle moves adjacent same on its path during weaving, a component for converting said signal to a signal of given duration sufficient to permit passage of the remaining magnetic elements without producing another signal during a weaving cycle, a signal producing device actuated for producing a signal at a predetermined point in the weaving cycle, a memory component receiving the signals from said pair of spaced sensing means producing a signal indicative of the position of the shuttle with respect to said spaced sensing means, and a logic component receiving said signal indicative of the position of the shuttle and said signal at a predetermined point in the weaving cycle effective to bring about a cessation of weaving if the shuttle is in a predetermined position when signal at a predetermined point is received.

37. For use in a loom with a weaving cycle having a shuttle, with a plurality of spaced magnetic elements carried thereon moving back and forth on a path during weaving, the improvement including, a pair of spaced electrical sensing means each positioned adjacent said shuttle path so as to produce an electrical signal as said shuttle moves adjacent same on its path during weaving, a component for converting said signal to an electrical signal of given duration sufficient to permit passage of the remaining magnetic elements without producing another signal during a weaving cycle, electronic means inverting the signals from said pair of spaced sensing means, an electrical signal producing device actuated for producing an electrical signal at a predetermined point in the weaving cycle, an electronic memory component receiving the inverted signals from said electronic means producing electrical signals coincident with the movement of the first magnetic element on the shuttle adjacent each of said spaced sensing means indicative of the position of the shuttle with respect to said spaced sensing means, and an electronic logic component receiving said signal indicative of the position of the shuttle and said signal at a predetermined point in the weaving cycle effective to bring about a cessation of weaving if the shuttle is in a predetermined position when signal at a predetermined point is received.

38. A protection system for a loom having a brake operated by a DC coil including, means producing a signal responsive to faulty loom operation, a circuit for overexciting the electric coil having a component for producing a signal of predetermined duration upon receiving a signal responsive to faulty loom operation, an electronic switching means receiving said signal of predetermined duration, electronic means amplifying said signal of predetermined duration to a higher than normal voltage level, and means applying the signal of predetermined duration in the form of a DC signal to the DC coil.

39. A protection system for a loom having a motor driving the loom through an electric clutch and having a brake operated by a DC coil for stopping weaving including, means producing a signal responsive to faulty loom operation, a bi-stable electronic component receiving said signal responsive to faulty loom operation deenergizing said clutch, a circuit for overexciting the electric coil having, a component for producing a signal of predetermined duration upon receiving said signal responsive to faulty loom operation, an electronic switching means receiving said signal of predetermined duration, electronic means amplifying said signal of predetermined duration to a higher than normal voltage level, and means applying the signal of predetermined duration in the form of a DC signal to the DC coil.

40. A protection system for a loom having a motor with a power take-off shaft including, a brake on said power take-off shaft operated by a DC coil, a clutch on said power take-off shaft, means producing a signal responsive to faulty loom operation, a bi-stable electrical element receiving said signal responsive to faulty loom operation deenergizing said clutch, a circuit for overexciting the coil having a component for producing a signal of predetermined duration upon receiving a signal responsive to faulty loom operation, an electronic switching means receiving said signal, means amplifying said signal to a higher than normal voltage level, and means applying the signal in the form of a DC signal to the DC coil.

41. In a loom having an electric motor with a coil constantly operating same driving the loom through an electric clutch having a coil for operating same, the improvement including, a first operator actuated means for energizing the clutch coil holding same energized and for deenergizing the brake coil, a second operator actuated means reversing the direction of turning of the motor and interrupting the operation of the first operator actuated means, and a third operator actuated means for intermittently energizing and deenergizing the clutch coil and the brake coil after actuation of said second operator actuated means permitting the loom to run intermittently in a reverse direction.

42. In a loom having a weaving cycle, a shuttle carrying a supply of filling yarn and a bunter actuated mechanism for changing the supply of filling yarn, the improvement including, means operating said bunter, means producing a signal indicating a low supply of filling yarn, means producing a signal indicating that the shuttle is not in the proper position in the weaving cycle for a filling change, a memory component receiving the signal indicating a low supply of filling yarn, said memory component activating the means operating said bunter placing the bunter in operable position, and means operated in conjunction with the memory component for holding the bunter in operable position for a predetermined time, said memory component upon receiving said signal indicating that the shuttle is not in the proper position in the weaving cycle for a filling change deactivating the means operating said bunter, said means operated in conjunction with the memory component releasing the bunter if no signal is received by the memory component indicating that the shuttle is not in the proper position.

43. In a loom having a weaving cycle, a shuttle carrying a supply of filling yarn, a bunter actuated mechanism for changing the supply of filling yarn and a motor operated through a clutch and brake for driving the loom on the weaving cycle, a solenoid operating said bunter, means producing a signal indicating a low supply of filling yarn, means producing a signal indicating that the shuttle is not in the proper position in the weaving cycle for a filling change, a memory component receiving the signal indicating a low supply of filling yarn, said memory component activating the solenoid placing the bunter in operable position responsive to the signal indicating a low supply of filling yarn, a solenoid timer operated by the memory component for holding the bunter in operable position for a predetermined time, and means energizing the brake and deenergizing the clutch, said memory component upon receiving said signal indicating that the shuttle is not in proper position in the weaving cycle for a filling change causing the memory component to deactivate the solenoid for releasing the bunter and actuating said means energizing the brake and deenergizing the clutch, said timer releasing the bunter if no signal is received by the memory component indicating that the shuttle is not in the proper position.

References Cited
UNITED STATES PATENTS

| | | | |
|---|---|---|---|
| 1,301,280 | 4/1919 | Lanning | 139—372 |
| 1,643,457 | 9/1927 | Jennings et al. | 139—263 |
| 2,408,645 | 10/1946 | Hunt | 139—79 |
| 2,489,978 | 11/1949 | Rogers et al. | 139—188 |
| 2,529,456 | 11/1950 | Nichols | 139—188 |
| 2,600,667 | 6/1952 | Mason | 139—341 |
| 2,705,507 | 4/1955 | Moon | 139—79 |
| 2,730,140 | 1/1956 | Lovshin et al. | 139—341 |
| 2,756,782 | 7/1956 | Applegate et al. | 139—341 |
| 2,889,855 | 6/1959 | Turner | 139—336 |
| 2,981,295 | 4/1961 | Paul et al. | 139—336 |

(Other references on following page)

UNITED STATES PATENTS

| | | | | |
|---|---|---|---|---|
| 3,097,669 | 7/1963 | Banks | 139—190 |
| 3,135,299 | 6/1964 | Abelsma | 139—336 |
| 3,137,323 | 6/1964 | Southworth | 139—188 |
| 3,181,573 | 5/1965 | Stutz | 139—341 |
| 3,201,537 | 8/1965 | Klatte et al. | 335—205 |
| 3,246,143 | 4/1966 | Steele et al. | 324—70 |
| 3,271,708 | 9/1966 | McCormick | 335—205 |

FOREIGN PATENTS

| | | |
|---|---|---|
| 318,591 | 2/1902 | France. |
| 1,020,426 | 11/1952 | France. |
| 1,113,112 | 11/1955 | France. |
| 329,479 | 5/1930 | Great Britain. |
| 169,322 | 8/1934 | Switzerland. |

HENRY S. JAUDON, *Primary Examiner.*